(12) United States Patent
Ichinose et al.

(10) Patent No.: US 7,901,500 B2
(45) Date of Patent: Mar. 8, 2011

(54) INK SET, INK JET RECORDING METHOD, INK CARTRIDGE, RECORDING UNIT, INK JET RECORDING APPARATUS, AND IMAGE FORMING METHOD

(75) Inventors: Hirofumi Ichinose, Setagaya-ku (JP); Kouhei Nakagawa, Yokohama (JP); Masako Udagawa, Kawasaki (JP); Hideki Takayama, Fujisawa (JP)

(73) Assignee: Canon Kabushiki Kaisha (JP)

( * ) Notice: Subject to any disclaimer, the term of this patent is extended or adjusted under 35 U.S.C. 154(b) by 222 days.

(21) Appl. No.: 11/370,111

(22) Filed: Mar. 7, 2006

(65) Prior Publication Data

US 2006/0203061 A1    Sep. 14, 2006

(30) Foreign Application Priority Data

Mar. 11, 2005    (JP) .................................. 2005-069840

(51) Int. Cl.
*C09D 11/02*    (2006.01)
(52) U.S. Cl. ...................................... 106/31.6; 106/31.9
(58) Field of Classification Search ................. 106/31.6, 106/31.9
See application file for complete search history.

(56) References Cited

U.S. PATENT DOCUMENTS

| | | | | |
|---|---|---|---|---|
| 5,792,380 A | * | 8/1998 | Wen et al. ................... | 252/62.56 |
| 6,637,876 B2 | * | 10/2003 | Hori ............................... | 347/100 |
| 6,846,353 B2 | * | 1/2005 | Sano et al. .................... | 106/31.6 |
| 6,953,244 B2 | * | 10/2005 | Chen et al. ..................... | 347/95 |
| 2005/0190245 A1 | * | 9/2005 | Desie et al. .................... | 347/100 |

FOREIGN PATENT DOCUMENTS

| | | |
|---|---|---|
| JP | 54-059139 A | 5/1979 |
| JP | 54-059936 A | 5/1979 |
| JP | 55-027282 A | 2/1980 |
| JP | 61-59911 B2 | 12/1986 |
| JP | 61-59912 B2 | 12/1986 |
| JP | 61-59914 B2 | 12/1986 |
| JP | 11-048502 A | 2/1999 |
| JP | 2003-238857 A | 8/2003 |
| JP | 2004-027127 A | 1/2004 |
| JP | 2004-099657 A | 4/2004 |
| JP | 2004-225036 A | 8/2004 |
| JP | 2004-250519 A | 9/2004 |

* cited by examiner

*Primary Examiner* — Jerry Lorengo
*Assistant Examiner* — Veronica Faison Gee
(74) *Attorney, Agent, or Firm* — Rossi, Kimms, McDowell LLP

(57) ABSTRACT

To provide an ink set which achieves an improvement in gradation of a monochrome image and the realization of a high black density, and which solves gloss unevenness occurring upon formation of an image by means of at least three kinds of black inks different from one another in carbon black content. Provided is an ink set having at least three kinds of black inks different from one another in carbon black content in which carbon black contents in the at least three kinds of inks establish a specific relationship.

12 Claims, 6 Drawing Sheets

INK SET, INK JET RECORDING METHOD, INK CARTRIDGE, RECORDING UNIT, INK JET RECORDING APPARATUS, AND IMAGE FORMING METHOD

BACKGROUND OF THE INVENTION

1. Field of the Invention

The present invention relates to an ink set having at least three kinds of black inks different from one another in carbon black content, an ink cartridge, a recording unit, and an ink jet recording apparatus each using multiple inks constituting the ink set, and an ink jet recording method and an image forming method each using the ink set.

2. Related Background Art

An ink jet recording method involves: ejecting small ink droplets; and applying ink to a recording medium such as paper to perform recording. In particular, an ink jet recording method of a mode in which an electrothermal transducer is used as ejection energy supplying means and thermal energy is applied to ink to generate air bubbles for the generation of droplets (a thermal ink jet recording method), a recording head can be easily provided with multiple openings at a high density, and a high-resolution, high-quality image can be recorded at a high speed (see, for example, Japanese Patent Publication Nos. S61-59911, S61-59912 and S61-59914).

Such ink jet recording techniques have recently found use in an expanded variety of applications. Accordingly, ink that can find use in a variety of applications has been desired. In particular, pigment ink using a pigment such as carbon black as a coloring material has been used for applications where emphasis is placed on fastness property. Even such applications of the pigment ink require not only the formation of a beautiful, colored image but also the formation of a monochrome image with beautiful gradation or a beautiful halftone.

The use of multiple black inks whose carbon black contents differ in a stepwise manner has been proposed for meeting such requirements as described above (see, for example, Japanese Patent Application Laid-Open Nos. H11-48502 and 2003-238857). The proposition describes that the use of such black inks can improve color reproducibility for a dark color of a shadow portion or the like or gray gradation, can stabilize a gray balance, and can dissolve metamerism (a phenomenon in which two colors different from each other in spectral reflectance appear to be the same color under a specific light source).

In the present invention, ink having an ordinary carbon black content is referred to as black ink, and ink having a small carbon black content is referred to as light black ink.

In addition, there has been proposed the use of at least three kinds of inks different from each other in pigment content as a set for the purposes of: reducing the reddish coloring property and yellowish coloring property of an image; reducing a golden gloss phenomenon; reducing a phase shift; improving the stability of a gray balance; and alleviating metamerism (see, for example, Japanese Patent Application Laid-Open Nos. 2004-027127, 2004-099657, 2004-225036 and 2004-250519). Furthermore, a proposal in which two or more kinds of light black inks are added to an ordinary ink set describes that an alleviating effect on the above-mentioned problem in terms of a tint or a hue is obtained by: causing each of these black inks to contain a coloring material except carbon black; providing an ink set having a combination including light cyan or light magenta; or providing an ink set having a combination including ink of each color (red, green, violet, or orange) or an ink set including a resin emulsion.

The reason why an ink set is obtained by adding two or more kinds of light black inks to an ordinary ink set in the above-described prior art is based on the following idea. That is, as compared to the case where only one kind of light black ink with regard to a carbon black content is added to an ink set, the case where another kind is further added so that inks can be classified into three kinds of inks having the same color tone and different from one another in pigment content is more advantageous for an improvement in gradation of an image to be obtained by means of such inks and a reduction in granularity of the image. In addition, in the above-described prior art, a specific range of a carbon black content in each of the inks having three kinds of pigment contents is specified as described below. A carbon black content in black ink having the smallest carbon black content is preferably 0.01 to 0.4 mass % with respect to the total mass of the ink. A carbon black content in black ink for an intermediate gray level having an intermediate carbon black content is preferably 0.4 to 1.5 mass % with respect to the total mass of the ink. A carbon black content in dense black ink having the largest carbon black content is preferably 1.5 to 10 mass % with respect to the total mass of the ink.

SUMMARY OF THE INVENTION

The inventors of the present invention have made investigation into the formation of an image on a recording medium by means of at least three kinds of black inks different from one another in carbon black content in ink as an ink set. As a result, they have found that a problem inherent in pigment ink occurs. That is, the inventors of the present invention have acknowledged that, when at least three kinds of black inks different from one another in carbon black content are used in combination to form an image, remarkable gloss unevenness that can be observed with the eyes may occur, that is, portions that are felt to be different from each other in gloss may occur in an image portion. In view of the foregoing, the inventors of the present invention have made extensive studies with a view to pursuing a cause for the above-mentioned problem. As a result, they have found that the occurrence of the gloss unevenness of a formed image is largely affected by a relationship among carbon black contents in black inks different from one another in carbon black content and the order in which the black inks are applied to a recording medium. On the basis of such finding, the inventors of the present invention have drawn the conclusion that there is a need to reduce gloss unevenness occurring upon formation of an image by means of at least three kinds of black inks different from one another in carbon black content, and to develop a new ink set which may solve the above-mentioned problem.

An ink set having two or three or more kinds of black inks has been proposed even in such prior art as described above. The preferable ranges of pigment contents in those black inks are classified into two or three stages. However, such prior art is specified while attention is paid only to an improvement in gradation of a monochrome image and the realization of a black density. That is, such prior art does not acknowledge that the agglomeration state of pigments on a recording medium to which black inks possessed by an ink set have been already applied is greatly changed by the order in which the inks are applied to the recording medium, and the change affects the gloss unevenness of an image.

Therefore, such prior art as described above cannot alleviate a problem called gloss unevenness occurring in a formed image owing to the order in which pigment inks are applied to a recording medium in ink jet recording using the inks.

In addition, there has been no report on investigation into the achievement of a reduction in gloss unevenness involving paying attention to a carbon black content in each of at least three kinds of black inks constituting a conventional ink set containing a combination of the inks.

Furthermore, no example has been known, in which investigation is made into a relationship between a black ink having a large carbon black content and each of a black ink having a small carbon black content and a black ink having an intermediate carbon black content in an ink set having at least three kinds of inks different from one another in carbon black content in ink and a result of the investigation is reported.

Therefore, an object of the present invention is to provide an ink set which achieves an improvement in gradation of a monochrome image and the realization of a high black density that have been conventionally of concern upon formation of an image by means of black ink, and which is capable of solving a new problem called gloss unevenness occurring upon formation of an image by means of at least three kinds of black inks different from one another in carbon black content.

Another object of the present invention is to provide an ink cartridge, a recording unit, an ink jet recording method, and an ink jet recording apparatus each of which is capable of forming an image with reduced gloss unevenness by means of the above-described ink set.

Another object of the present invention is to provide an image-forming method which achieves an improvement in gradation of a monochrome image and the realization of a high black density that have been conventionally of concern upon formation of an image by means of black ink, and which is capable of solving a new problem called gloss unevenness occurring upon formation of an image by means of at least three kinds of black inks different from one another in carbon black content.

The above objects are achieved by the present invention described below. That is, according to one aspect of the present invention, there is provided an ink set comprising at least three kinds of black inks different from one another in carbon black content in ink, wherein: the at least three kinds of black inks comprise a black ink Bk1 having a largest carbon black content, a light black ink Lk2 having a smallest carbon black content, and a light black ink Lk1 having a carbon black content smaller than that of the black ink Bk1 and larger than that of the light black ink Lk2; the black ink Bk1, the light black ink Lk1, and the light black ink Lk2 each comprise a resin; a ratio (Bk1/Lk2) of the carbon black content in the black ink Bk1 to the carbon black content in the light black ink Lk2 is in a range of 3.5 or more to 9.0 or less; a ratio (Lk1/Lk2) of the carbon black content in the light black ink Lk1 to the carbon black content in the light black ink Lk2 is in a range of 2.0 or more to 4.0 or less; and the carbon black content (mass %) in the black ink Bk1 is in a range of 2.5 mass % or more to 4.5 mass % or less with respect to a total mass of the black ink Bk1.

According to another aspect of the present invention, there is provided an ink jet recording method, comprising the steps of: ejecting ink by an ink jet method; and performing recording on a recording medium, in which the ink comprises the at least three kinds of black inks constituting the ink set according to the above-constitution.

According to still another aspect of the present invention, there is provided an ink cartridge comprising an ink storage portion for storing ink, wherein the ink comprises the at least three kinds of black inks constituting the ink set according to the above-constitution.

According to further another aspect of the present invention, there is provided a recording unit comprising: an ink storage portion for storing ink; and a recording head for ejecting the ink, wherein the ink comprises the at least three kinds of black inks constituting the ink set according to the above-constitution.

According to yet another aspect of the present invention, there is provided an ink jet recording apparatus comprising: an ink storage portion for storing ink; and a recording head for ejecting the ink, wherein the ink comprises the at least three kinds of black inks constituting the ink set with the above-constitution.

According to yet still another aspect of the present invention, there is provided an image forming method for forming an image on a recording medium using at least three kinds of black inks different from one another in carbon black content in ink in combination, wherein: the at least three kinds of black inks comprises a black ink Bk1 having a largest carbon black content, a light black ink Lk2 having a smallest carbon black content, and a light black ink Lk1 having a carbon black content smaller than that of the black ink Bk1 and larger than that of the light black ink Lk2; the black ink Bk1, the light black ink Lk1, and the light black ink Lk2 each comprise a resin; a ratio (Bk1/Lk2) of the carbon black content in the black ink Bk1 to the carbon black content in the light black ink Lk2 is in a range of 3.5 or more to 9.0 or less; a ratio (Lk1/Lk2) of the carbon black content in the light black ink Lk1 to the carbon black content in the light black ink Lk2 is in a range of 2.0 or more to 4.0 or less; and the carbon black content (mass %) in the black ink Bk1 is in a range of 2.5 mass % or more to 4.5 mass % or less with respect to a total mass of the black ink Bk1.

According to the present invention, a new problem found through investigation into the formation of an image by means of at least three kinds of inks different from one another in carbon black content, that is, gloss unevenness can be solved. Furthermore, there can be provided an ink set which is capable of alleviating the above-described gloss unevenness and of achieving an improvement in gradation of a monochrome image and the realization of a high black density. In addition, according to another embodiment of the present invention, there can be provided an ink cartridge, a recording unit, an ink jet recording method, and an ink jet recording apparatus each of which is capable of forming an image with reduced gloss unevenness by means of the above-described ink set. In addition, according to another embodiment of the present invention, there can be provided an image-forming method which achieves an improvement in gradation of a monochrome image and the realization of a high black density that have been conventionally of concern upon formation of an image by means of black ink, and which is capable of solving a new problem called gloss unevenness occurring upon formation of an image by means of at least three kinds of black inks different from one another in carbon black content.

DESCRIPTION OF THE PREFERRED EMBODIMENTS

Hereinafter, the present invention will be described in detail by way of a preferred embodiment of the present invention. The inventors of the present invention have made investigation into a phenomenon called "agglomeration" inherent in pigment ink in an ink set having at least three kinds of black inks different from one another in carbon black content for such prior art as described above. As a result, they have found the following. That is, pigment ink using carbon black as a coloring material has a secondary particle formed as a result of agglomeration of fine particles, so it is extremely difficult to reduce gloss unevenness through the control of the agglomeration state of carbon black on a recording medium as compared to ink using an organic pigment as a coloring material. For this reason, the inventors have acknowledged that a relationship among carbon black contents in at least three kinds of black inks different from one another in carbon black content must be properly controlled upon formation of an image by means of an ink set having the black inks, thereby completing the present invention.

Figure 5A:
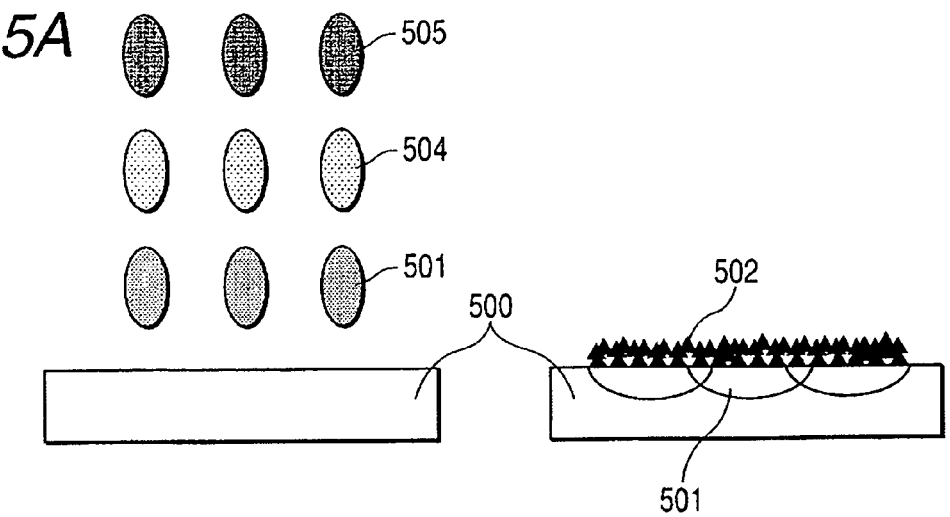
FIGS. 5A, 5B, and 5C are schematic views each showing a state where ink is fixed to a recording medium upon formation of an image by means of three kinds of black inks different from one another in carbon black content in the present invention.

According to the investigation of the present inventors, gloss unevenness occurring upon formation of an image by means of at least three kinds of black inks different from one another in carbon black content can be classified into two kinds to be described later depending on a cause for the occurrence of gloss unevenness. However, in the present invention, those two phenomena are collectively referred to as "gloss unevenness". First "gloss unevenness" refers to the following. When ink having a component that can permeate through a recording medium at a high rate is applied to the recording medium at first, gloss becomes uneven owing to a partial difference in agglomeration state of carbon black on the recording medium, so a "haze-like product" that can be visually observed as a difference in gloss occurs on an image. Second "gloss unevenness" refers to the following. For example, when an image is formed by means of a head having such constitution as shown in FIG. 5A, that is, an asymmetric head, the approaching route and returning route of a printing pass are different from each other in order in which inks are applied to a recording medium. Therefore, an image formed in the approaching route and an image formed in the returning route are different from each other in gloss, so "belt-like unevenness" that can be visually observed as a difference in gloss occurs on an image. The mechanism via which such gloss unevenness occurs will be described in detail later.

The inventors of the present invention have made investigation over the ink constitution which may solve the above-described gloss unevenness. As a result, they have found that such new problem as described above occurring in an ink set having three or more kinds of black inks different from one another in carbon black content can be solved merely by optimizing a relationship among carbon black contents in the respective black inks without adopting means such as the addition of resin fine particles to the respective black inks or the adjustment of the content of the resin fine particles. Furthermore, they have found that an ink set having such constitution can improve the gradation of a monochrome image and can realize a high black density which are conventional problems.

That is, the present invention has been made on the basis of the finding found as a result of investigation involving paying attention to a phenomenon occurring specifically to pigment ink upon formation of an image by means of an ink set having at least three kinds of black inks different from one another in carbon black content, that is, the agglomeration state of carbon black on a recording medium to which each black inks have been already applied.

An ink set having at least three kinds of black inks different from one another in carbon black content as the main constitution of the present invention is obtained according to the relationship between the black ins below as a result of detailed investigation into the mechanism of fixation after the application of ink to a recording medium. That is, the present invention includes a black ink Bk1 having the largest carbon black content, a light black ink Lk2 having the smallest carbon black content, and a light black ink Lk1 having a carbon black content smaller than that of the black ink Bk1 and larger than that of the light black ink Lk2. Furthermore, in the ink set, the carbon black content (mass %) in the black ink Bk1 is in the range of 2.5 mass % or more to 4.5 mass % or less with respect to the total mass of the black ink Bk1 while the relationship of a ratio (Bk1/Lk2) of the carbon black content in the black ink Bk1 to the carbon black content in the light black ink Lk2 and the relationship of a ratio (Lk1/Lk2) of the carbon black content in the light black ink Lk1 to the carbon black content in the light black ink Lk2 are sufficiently taken into consideration.

Furthermore, the inventors of the present invention have made investigation into how the agglomeration state of carbon black on a recording medium can be appropriate upon formation of an image on the recording medium by means of the ink set according to the present invention, that is, how the constitution of each ink should be controlled in such a manner that an image having reduced gloss unevenness and excellent quality can be obtained. As a result, they have found that, in the combination of black inks as the above-described main constitution of present invention, the agglomeration state of carbon black on a recording medium can be properly controlled by causing each black ink to contain a resin together with carbon black, thereby completing the present invention.

The term "reduction in gloss unevenness" as used herein refers to the elimination of each of: a "haze-like product" that can be visually observed as a difference in gloss on an image; and "belt-like unevenness" that can be visually observed due to the apparent generation of a portion having high gloss and a portion having low gloss in an image in the approaching route and returning route of a printing pass.

An image formed by an ink jet recording method using pigment ink is inferior in gloss to an image formed by an ink jet recording method using dye ink using a dye as a coloring material. The reason for this is probably as described below. When the pigment ink is applied to a recording medium, pigment particles dispersed in the ink are fixed to the recording medium while the particles are in an agglomeration state. Therefore, irregularities generate on the recording medium, with the result that light is irregularly reflected.

Figure 1A:
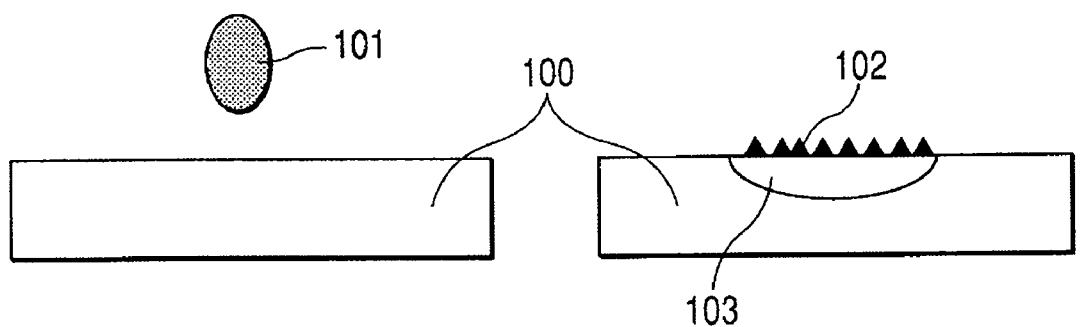
FIGS. 1A and 1B are schematic views each showing a state where pigment ink and dye ink are applied to a recording medium by an ink jet recording method so that each ink is fixed to the recording medium.
Figure 1B:
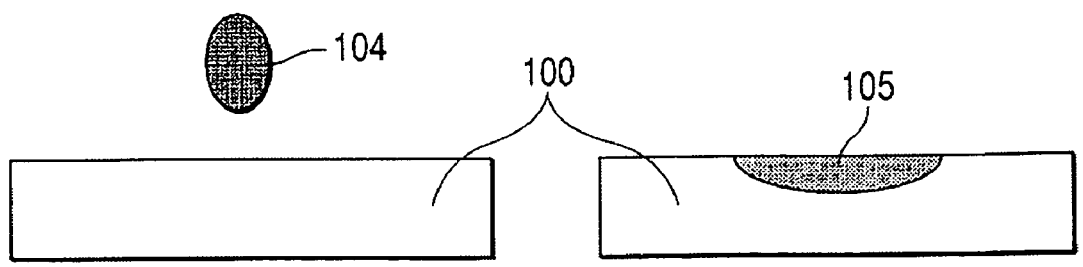

At first, description will be given of a state commencing on the application of each of pigment ink and dye ink to a recording medium and ending on the fixation of each ink to the recording medium in case of the formation of an image by means of the inks with reference to FIGS. 1A and 1B. FIG. 1A is a schematic view showing an example of a state commencing on the application of pigment ink to a recording medium by means of an ink jet recording method and ending on the fixation of the ink to the recording medium. Meanwhile, FIG. 1B is a schematic view showing an example of a state commencing on the application of dye ink to a recording medium by an ink jet recording method and ending on the fixation of the ink to the recording medium. Here, description will be given of ink containing carbon black as a pigment as an example.

In FIG. 1A, a pigment ink droplet 101 contains carbon black 102 and a liquid component 103 such as any other aqueous medium. Then, after the pigment ink droplet 101 has been applied to a recording medium 100, the liquid component 103 constituting the pigment ink permeates into an ink-receiving layer of the recording medium 100. At this time, part of the carbon black 102 permeates into the ink-receiving layer of the recording medium 100 as in the case of the liquid component 103. However, most of the carbon black 102 does not permeate into the ink-receiving layer of the recording medium 100, but is fixed in an agglomeration state to the surface of the recording medium 100.

Meanwhile, in FIG. 1B, a dye ink droplet 104 contains the liquid component 103 such as an aqueous medium in the ink and a dye 105 uniformly dissolved into the liquid component 103. Then, after the dye ink droplet 104 has been applied to the recording medium 100, the dye 105 and the liquid component 103 permeate together into the ink-receiving layer of the recording medium 100.

At this time, an image formed by means of the pigment ink and an image formed by means of the dye ink are different from each other in gloss. That is, as described above with reference to FIG. 1B, in case of the dye ink, the dye 105 is present while being dissolved into the ink. For this reason, when the dye ink is applied to the recording medium 100, the ink does not agglomerate on the surface of the recording medium 100 unlike carbon black described above. Therefore, the gloss of an image is close to the gloss possessed by the recording medium 100 themselves. In this case, the use of a recording medium having excellent gloss provides an image with excellent gloss.

On the other hand, as described above with reference to FIG. 1A, in case of the pigment ink, the carbon black 102 is present while being dispersed into the ink. Therefore, when the pigment ink is applied to the recording medium 100, the ink agglomerates on the surface of the recording medium 100. The reason for this is as described below. The particle size of the carbon black 102 is relatively large as compared to the diameter of a fine pore of the ink-receiving layer of the recording medium 100. Accordingly, most of the carbon black 102 does not permeate into the ink-receiving layer of the recording medium 100, but is fixed in an agglomeration state to the surface of the recording medium 100. Therefore, the gloss of an image depends on the degree of irregularities generated by the agglomeration of the carbon black 102 fixed to the surface of the recording medium 100. In this case, even when a recording medium having excellent gloss is used, the gloss of an image is apt to be poor.

Therefore, when an image is formed by means of multiple inks different from each other in carbon black content, the agglomeration state of carbon black on the surface of the recording medium 100 varies depending on a carbon black content in ink. The variation is considered to affect the gloss unevenness of an image.

Figure 2A:
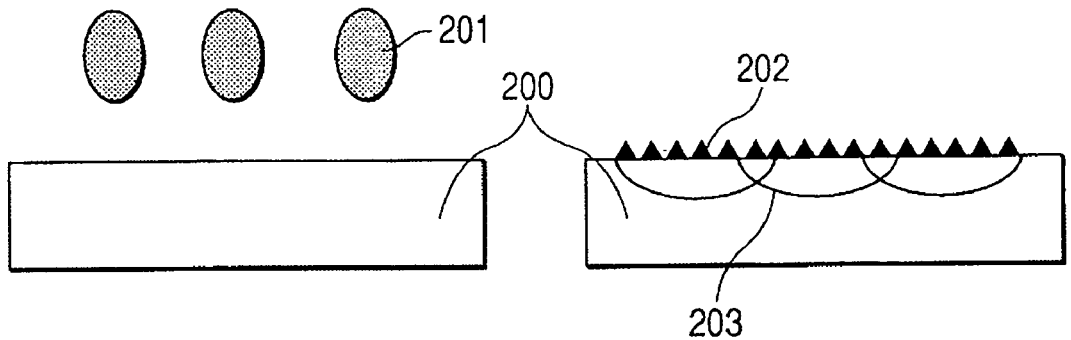
FIGS. 2A, 2B, and 2C are schematic views each showing a state where ink is fixed to a recording medium upon formation of an image by means of each of three kinds of inks different from one another in carbon black content independently.
Figure 2B:
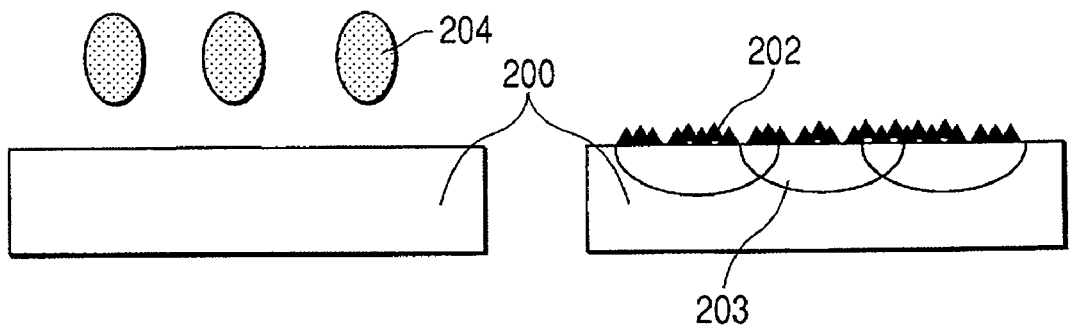
Figure 2C:
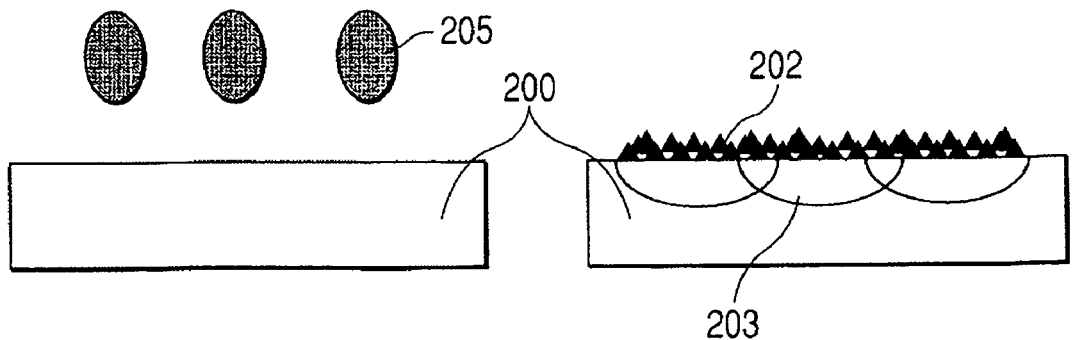

Description will be given of a state commencing on the application of each of three kinds of inks different from one another in carbon black content to a recording medium and ending on the fixation of the ink to the recording medium in case of the formation of an image by means of each of the inks independently with reference to FIGS. 2A to 2C. FIG. 2A is a schematic view showing an example of a state commencing on the application of the light black ink Lk2 having the smallest carbon black content to a recording medium by means of an ink jet recording method and ending on the fixation of the ink to the recording medium. FIG. 2B is a schematic view showing an example of a state commencing on the application of the light black ink Lk1 having an intermediate carbon black content to a recording medium by means of an ink jet recording method and ending on the fixation of the ink to the recording medium. FIG. 2C is a schematic view showing an example of a state commencing on the application of the black ink Bk1 having the largest carbon black content to a recording medium by means of an ink jet recording method and ending on the fixation of the ink to the recording medium.

In FIG. 2A, a droplet 201 of the light black ink Lk2 having the smallest carbon black content contains carbon black 202 and a liquid component 203 such as any other aqueous medium. Then, after the droplet 201 of the light black ink Lk2 has been applied to a recording medium 200, the liquid component 203 constituting the light black ink Lk2 permeates into an ink-receiving layer of the recording medium 200. At this time, the carbon black 202 is fixed in an agglomeration state to the surface of the recording medium 200. Here, the light black ink Lk2 has a small carbon black content. Therefore, when the amount of the ink to be applied to the recording medium is small, the gloss of an image is close to the gloss possessed by the recording medium 200 themselves. In addition, as the amount of the ink to be applied to the recording medium increases, the amount of carbon black fixed in an agglomeration state to the surface of the recording medium 200 increases. However, the degree of irregularities generated by the agglomeration of the carbon black 202 fixed to the surface of the recording medium 200 is suppressed to a low level because the light black ink Lk2 has a small carbon black content. As a result, the gloss of an image is slightly inferior to the gloss possessed by the recording medium 200 themselves.

In FIG. 2B, a droplet 204 of the light black ink Lk1 having an intermediate carbon black content contains the carbon black 202 and the liquid component 203 such as any other aqueous medium. The carbon black content of the light black ink Lk1 is larger than that of the above-described light black ink Lk2, and is smaller than that of the black ink Bk1 to be described later. Then, after the droplet 204 of the light black ink Lk1 has been applied to the recording medium 200, the liquid component 203 constituting the light black ink Lk1 permeates into the ink-receiving layer of the recording medium 200. At this time, the carbon black 202 is fixed in an agglomeration state to the surface of the recording medium 200. Here, the light black ink Lk1 has a carbon black content which is low to some extent. Therefore, when the amount of the ink to be applied to the recording medium is small, the gloss of an image is close to the gloss possessed by the recording medium 200 themselves to some extent. In addition, as the amount of the ink to be applied to the recording medium increases, the amount of carbon black fixed in an agglomeration state to the surface of the recording medium 200 increases. However, the degree of irregularities generated by the agglomeration of the carbon black 202 fixed to the surface of the recording medium 200 is higher than that in the case where the light black ink Lk2 is used to some extent, but is suppressed to a level lower than that in the case where the black ink Bk1 to be described later is used because the light black ink Lk1 has a small carbon black content, but the content is larger than the carbon black content of the light black ink Lk2. As a result, the gloss of an image is slightly inferior to the gloss possessed by the recording medium 200 themselves, but some degree of gloss can be obtained.

In FIG. 2C, a droplet 205 of the black ink Bk1 having the largest carbon black content contains the carbon black 202 and the liquid component 203 such as any other aqueous medium. Here, the black ink Bk1 must contain carbon black in an amount enough to obtain an image having a sufficient image density (black density). Then, after the droplet 205 of the black ink Bk1 has been applied to the recording medium 200, the liquid component 203 constituting the black ink Bk1 permeates into the ink-receiving layer of the recording medium 200. At this time, the carbon black 202 is fixed in an agglomeration state to the surface of the recording medium 200. Here, the black ink Bk1 has a large carbon black content owing to the above-mentioned reason. Therefore, even when the amount of the ink to be applied to the recording medium is small, the amount of carbon black fixed in an agglomeration state to the surface of the recording medium 200 is large. Furthermore, carbon black particles are superimposed on each other to agglomerate. Therefore, the degree of irregularities generated by the agglomeration of the carbon black 202 fixed to the surface of the recording medium 200 is high, so the scattering or the like of light occurs. As a result, the gloss of an image is low as compared to that in the case where the light black ink Lk1 or the light black ink Lk2 described above is used.

Therefore, when an image is formed by means of at least three kinds of black inks having such characteristics as described above and different from one another in carbon black content, the characteristics of the respective inks must be sufficiently taken into consideration.

Furthermore, the inventors of the present invention have found that, when an image is formed by means of at least three kinds of inks different from one another in carbon black content, the order in which the inks are applied and a relationship among the amounts of the inks to be applied significantly affect the gloss of an image. This finding is obtained as a result of detailed investigation into the state of the fixation of each of the black inks different from one another in carbon black content, that is, a relationship between the permeation of a liquid component such as an aqueous medium constituting the ink into a recording medium and the agglomeration of carbon black.

When an image is formed by means of at least three kinds of black inks different from one another in carbon black content, black inks to be used for forming a dark black image portion, a pale black image portion, and a halftone image are generally used in combination as described below to represent the sufficient gradation of a monochrome image. That is, the case where each black ink is used alone and the case where two or three kinds of black inks are used in combination are possible. However, the gloss of an image formed by means of multiple black inks different from each other in carbon black content is different from that of an image formed by means of each ink alone. Furthermore, the gloss of an image resulting from a printing pass changes. This phenomenon is explained as described below.

Figure 3A:
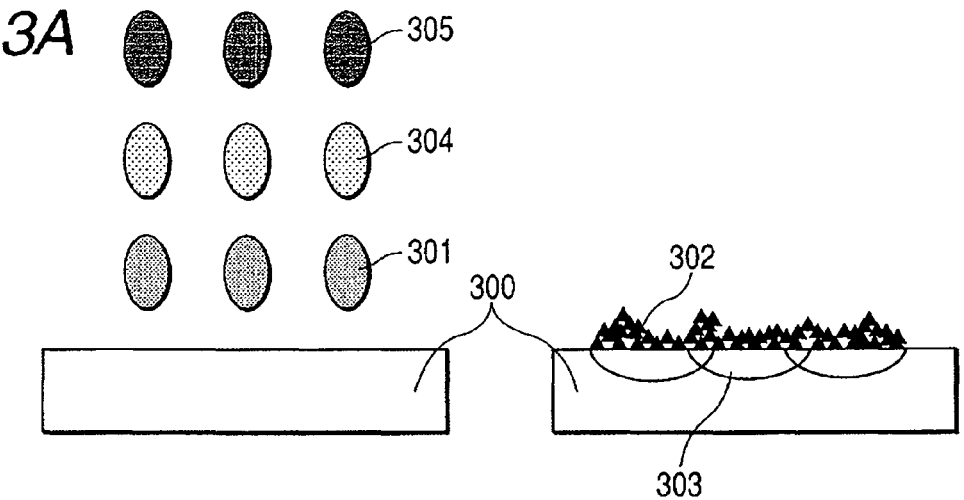
FIGS. 3A, 3B, and 3C are schematic views each showing a state where ink is fixed to a recording medium upon formation of an image by means of three kinds of conventional black inks different from one another in carbon black content.
Figure 3B:
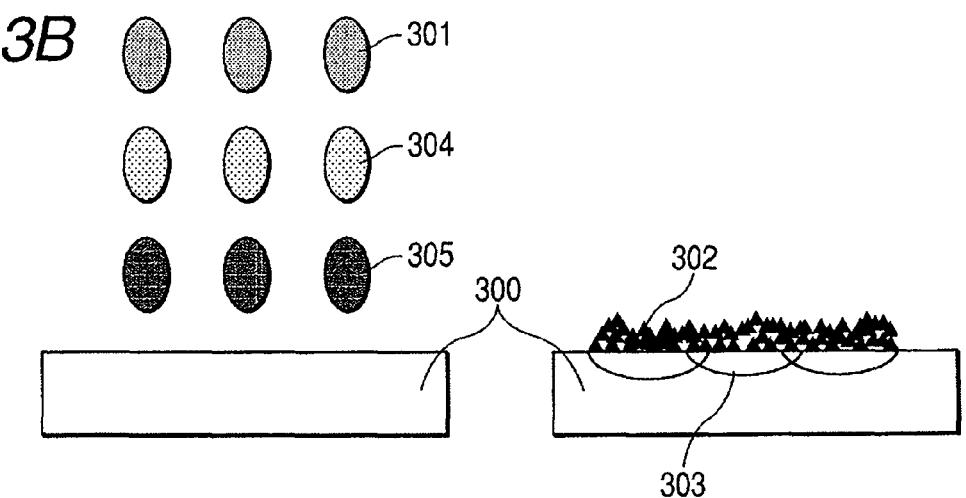

Description will be given of a state commencing on the application of three kinds of conventional black inks different from one another in carbon black content to a recording medium and ending on the fixation of the inks to the recording medium in case of the formation of an image by means of the inks with reference to FIGS. 3A and 3B. In FIGS. 3A and 3B, reference numerals 301, 305, and 304 denote the light black ink Lk2 having the smallest content of carbon black 302, the black ink Bk1 having the largest content of the carbon black 302, and the light black ink Lk1 having an intermediate content of the carbon black 302, respectively.

The term "three kinds of conventional black inks different from one another in carbon black content" as used herein refers to the fact a combination of three kinds of black inks does not satisfy at least one of the following conditions (1) to (3). The fact means that the main constitution of the ink set according to the present invention is not satisfied.

(1) The carbon black content in the black ink Bk1 having the largest carbon black content is in the range of 2.5 mass % or more to 4.5 mass % or less.

(2) A ratio (Bk1/Lk2) of the carbon black content of the black ink Bk1 having the largest carbon black content to the carbon black content of the light black ink Lk2 having the smallest carbon black content is in the range of 3.5 or more to 9.0 or less.

(3) A ratio (Lk1/Lk2) of the carbon black content of the light black ink Lk1 having a carbon black content smaller than that of the black ink Bk1 and larger than that of the light black ink Lk2 to the carbon black content of the light black ink Lk2 having the smallest carbon black content is in the range of 2.0 or more to 4.0 or less.

FIG. 3A is a schematic view showing an example of the state of the formation of an image. In this example, the droplet 301 of the light black ink Lk2, the droplet 304 of the light black ink Lk1, and the droplet 305 of the black ink Bk1 are applied in the stated order to a recording medium. In addition, FIG. 3B is a schematic view showing an example of the state of the formation of an image. In this example, the droplet 305 of the black ink Bk1, the droplet 304 of the light black ink Lk1, and the droplet 301 of the light black ink Lk2 are applied in the stated order to a recording medium.

In FIG. 3A, when the droplet 301 of the light black ink Lk2, the droplet 304 of the light black ink Lk1, and the droplet 305 of the black ink Bk1 are applied in the stated order to the recording medium, such state as described below is obtained. A liquid component 303 constituting the droplet 301 of the light black ink Lk1 applied to a recording medium 300 at first quickly permeates into an ink-receiving layer of the recording medium 300. Then, separation between the carbon black 302 and the liquid component 303 is quickly performed, so the carbon black 302 is fixed in an agglomeration state to the surface of the recording medium 300. Then, the carbon black 302 fixed to the recording medium 300 is in a dry state at an early stage. As a result, the carbon black is considered to clog the ink-receiving layer. Therefore, the liquid components 303 constituting the droplet 304 of the light black ink Lk1 and the droplet 305 of the black ink Bk1 applied to the recording medium 300 after the light black ink Lk2 hardly permeate into the ink-receiving layer of the recording medium 300. As a result, the carbon black 302 cannot obtain a uniform agglomeration state upon fixation to the surface of the recording medium 300, so partial irregularities are apt to generate. The degree of partial irregularities causes a portion having high gloss and a portion having low gloss to be present. That is, gloss unevenness occurs.

On the other hand, in FIG. 3B, when the droplet 305 of the black ink Bk1, the droplet 304 of the light black ink Lk1, and the droplet 301 of the light black ink Lk2 are applied in the stated order to the recording medium, such state as described below is obtained. The liquid component 303 constituting the droplet 305 of the black ink Bk1 applied to the recording medium 300 at first quickly permeates into the ink-receiving layer of the recording medium 300. Then, separation between the carbon black 302 and the liquid component 303 is quickly performed, so the carbon black 302 is fixed in an agglomeration state to the surface of the recording medium 300. Then, the carbon black 302 fixed to the recording medium is in a dry state at an early stage. As a result, the carbon black is considered to clog the ink-receiving layer. At this time, in the case where the black ink Bk1 is applied to the recording medium prior to the other inks, the rate at which the liquid component permeates into the ink-receiving layer of the recording medium 300 is slower than that in such case where the light black ink 301 is applied to the recording medium prior to the other ink as described above with reference to FIG. 3A. Therefore, the carbon black 302 constituting the droplet 305 of the black ink Bk1 hardly clogs the ink-receiving layer of the recording medium 300. Therefore, the liquid components 303 constituting the droplet 304 of the light black ink Lk1 and the droplet 301 of the light black ink Lk2 applied to the recording medium 300 after the black ink Bk1 easily permeate into the ink-receiving layer of the recording medium 300. As a result, the carbon black 302 tends to obtain a uniform agglomeration state upon fixation to the surface of the recording medium 300 with some degree of ease as compared to the case of FIG. 3A. However, an image to be obtained is formed by means of ink using carbon black, which is a pigment, as a coloring material, so the entire gloss of the image is not very high.

As can be seen from FIGS. 3A and 3B, both images formed by means of the same three kinds of black inks are largely different from each other in agglomeration state of carbon black on the surface of the recording medium 300 despite the fact that only the order in which the three kinds of black inks are applied to the recording medium is changed. This result shows also that the gloss of an image is largely changed by the order in which three kinds of inks different from one another in carbon black content are applied to a recording medium. Furthermore, when the diameter of a fine pore of the ink-receiving layer of a recording medium is sufficiently small as compared to the particle size of carbon black like a recording medium having gloss, the permeation rate of a liquid component in ink applied to the recording medium at first and the permeation rate of a liquid component in ink applied to the recording medium next are different from each other. As a result, the agglomeration state of carbon black on the surface of the recording medium changes.

Figure 3C:
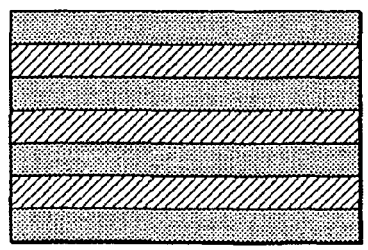

As described above, when at least three kinds of black inks different from one another in carbon black content are used for the purpose of, for example, improving gradation upon formation of an image, potential examples of the order in which the respective black inks are applied to a recording medium include several orders as well as those of FIGS. 3A and 3B described above. However, in any case, the gloss of an image to be obtained is changed by the order in which the respective black inks are applied to the recording medium. Such phenomenon as described above remarkably appears in the form of a state where gloss varies in a belt fashion as shown in FIG. 3C because, when an image is formed by means of an asymmetric head (see FIG. 6A), the order in which the inks are applied to a recording medium in the approaching route of a printing pass is different from that in the returning route of the printing pass.

Figure 6A:
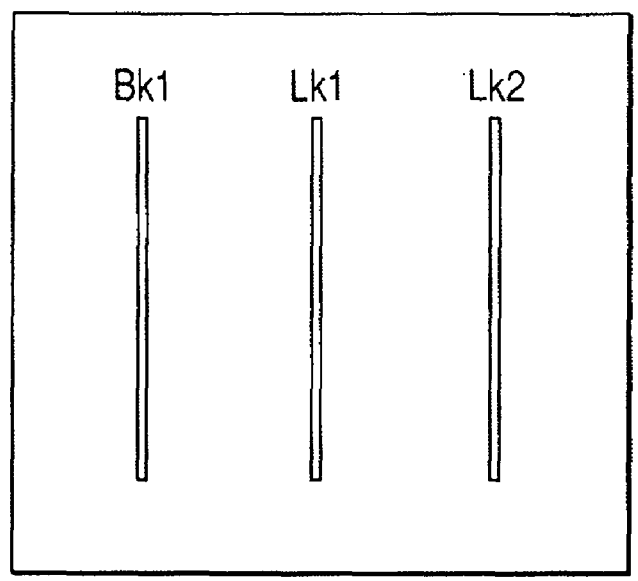
FIGS. 6A and 6B are schematic views each showing an example of the constitution of a recording head.
Figure 6B:
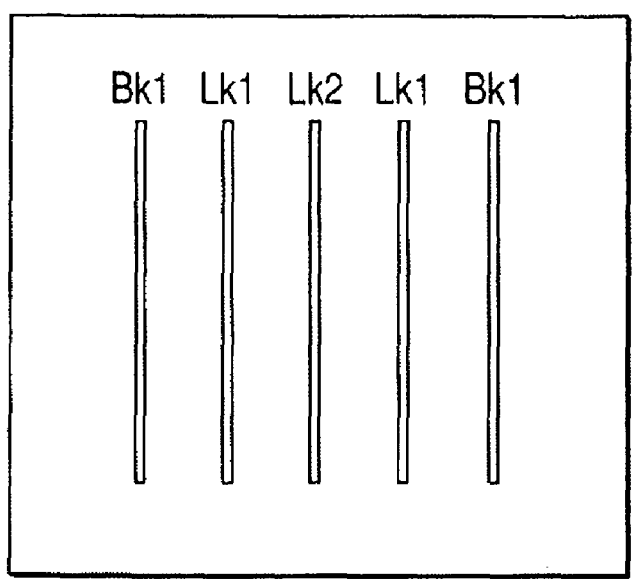

Here, the use of, for example, a head having such constitution as shown in FIG. 6B, that is, a symmetric head can cope with gloss unevenness occurring owing to a change in order in which at least three kinds of black inks different from one another in carbon black content are applied to a recording medium upon formation of an image by means of the black inks. The use of such symmetric head as shown in FIG. 6B can make the order in which inks are applied to a recording medium in the approaching route of a printing pass and that in the returning route of the printing pass always identical to each other. However, a combination of black inks satisfying the constitution of the present invention enables an image with sufficiently reduced gloss unevenness to be obtained even in the case where such asymmetric head as shown in FIG. 6A is used, that is, the case where the order in which inks are applied to a recording medium in the approaching route of a printing pass and that in the returning route of the printing pass are different from each other. FIGS. 6A and 6B each show an example in which ejection opening trains of the respective black inks are amounted on one chip. However, the present invention is not limited to the example. In addition, the order in which the ejection opening trains of the respective black inks are arranged is not limited to those of FIGS. 6A and 6B.

Figure 4A:
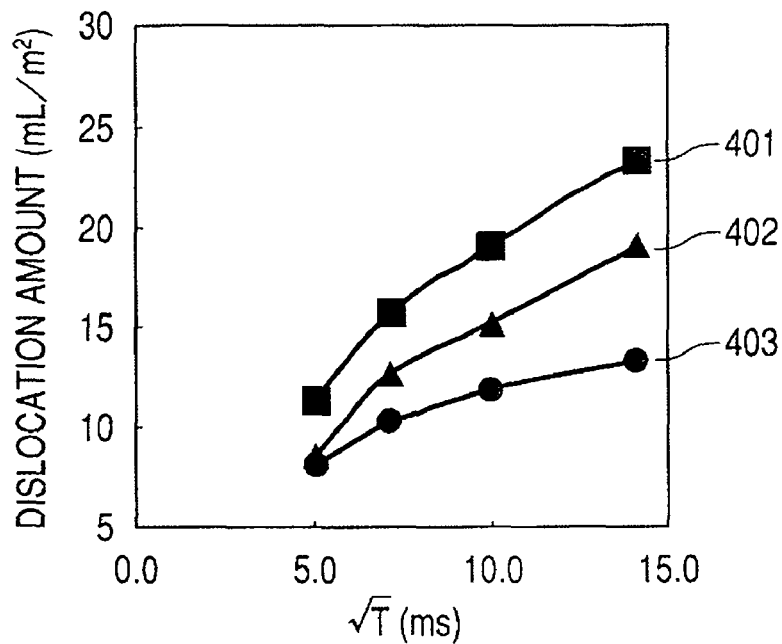
FIGS. 4A and 4B are graphs each showing an example of the rates at which black inks different from one another in carbon black content permeate through a recording medium.

FIG. 4A is a graph showing the rates at which three kinds of black inks different from one another in carbon black content permeate through a recording medium. In FIG. 4A, the axis of abscissa indicates a time (ms) and the axis of ordinate indicates a dislocation amount (mL/m$^2$). The term "dislocation amount" refers to the dislocation amount of a liquid component constituting ink with respect to a recording medium. A relationship between a carbon black content in ink and the rate at which a liquid component constituting each ink permeates through a recording medium is determined by measuring the rate at which each of multiple black inks different from each other in carbon black content permeates through the recording medium. Bristow's method was used for measuring a permeation rate, and a super photopaper SP-101 (manufactured by Canon Inc.) as a recording medium having gloss was used as the recording medium.

FIG. 4A shows comparison among, for example, three kinds of inks having carbon black contents of 2.5 mass %, 0.80 mass %, and 0.25 mass % and having the other ink components identical to one another. The relationship of carbon black contents in the three kinds of inks do not satisfy the constitution of the present invention. Reference numeral 401 (■) denotes the permeation rate of black ink having the smallest carbon black content (0.25 mass %) (the ink corresponds to the light black ink Lk2); 402 (▲), the permeation rate of black ink having an intermediate carbon black content (0.8 mass %) (the ink corresponds to the light black ink Lk1); and 403 (●), the permeation rate of black ink having the largest carbon black content (2.5 mass %) (the ink corresponds to the black ink Bk1). The rate at which each black ink permeates through the recording medium can be determined on the basis of a relationship between the dislocation amount of the ink measured by means of Bristow's method and a time. As can be seen from FIG. 4A, the permeation rate 401 (■) of the light black ink having the smallest carbon black content is highest among the three kinds of inks, and the permeation rate 403 (●) of the black ink having the largest carbon black content is lowest among the three kinds of inks.

Figure 4B:
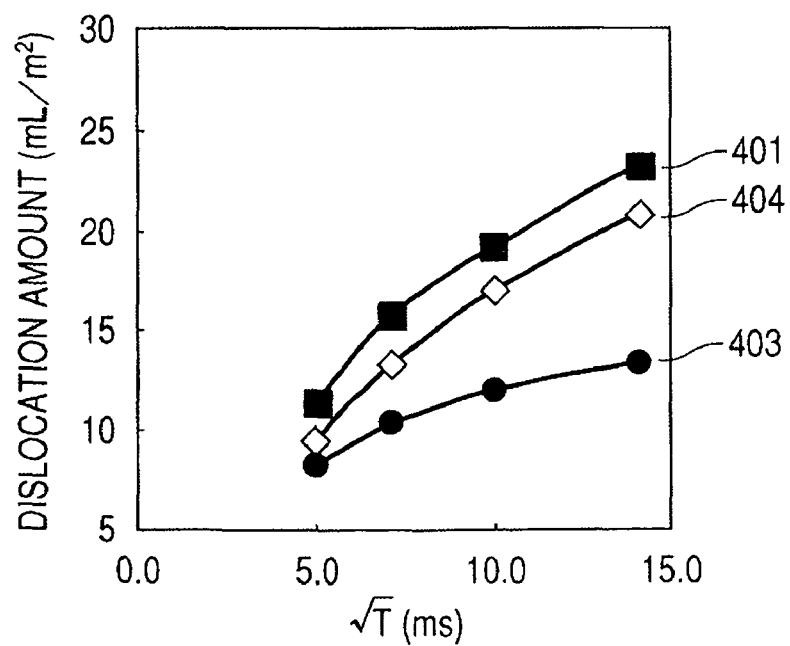

FIG. 4B is a graph showing comparison between the case where a value for a ratio Bk1/Lk2 between the black ink Bk1 and the light black ink Lk2 with the largest difference in permeation rate between them out of the three black inks constituting the ink set satisfies the constitution of the present invention and the case where the value does not satisfy the constitution. Reference numeral 401 (■) denotes the permeation rate of black ink having the smallest carbon black content (0.25 mass %) (the ink corresponds to the light black ink Lk2). Reference numeral 404 (◇) denotes the permeation rate of black ink having the carbon black content of 0.4 mass % (the ink also corresponds to the light black ink Lk2). Reference numeral 403 (●) denotes the permeation rate of black ink having the largest carbon black content (2.5 mass %) among the three inks (the ink corresponds to the black ink Bk1). A value for the ratio Bk1/Lk2 between the light black ink Lk2 (◇) having a carbon black content of 0.4 mass % and the black ink Bk1 (●) having a carbon black content of 2.5 mass % satisfies the constitution of the present invention. In addition, a value for the ratio Bk1/Lk2 between the light black ink Lk2 (■) having a carbon black content of 0.25 mass % and the black ink Bk1 (●) having a carbon black content of 2.5 mass % does not satisfy the constitution of the present invention. As can be seen from FIG. 4B, comparison between the case where the value for the ratio Bk1/Lk2 satisfies the constitution of the present invention and the case where the value does not satisfy the constitution, a difference in permeation rate between the black ink Bk1 and the light black ink Lk2 becomes small in the case where the value satisfies the constitution.

The inventors of the present invention have made investigation into a relationship between the rate at which such ink as described above permeates through a recording medium and the agglomeration state of carbon black on the surface of the recording medium. As a result, they have found that a difference in agglomeration rate of carbon black between the black ink Bk1 and the light black ink Lk2 with the largest difference in permeation rate between them out of the black inks constituting an ink set can be reduced by reducing a difference in rate at which each of both the black inks permeates through a recording medium between the black inks. Furthermore, they have found that the agglomeration state of carbon black with improved uniformity can be obtained by alleviating a difference in agglomeration rate irrespective of a difference in order in which respective black inks are applied to a recording medium. The present invention has been made on the basis of such findings, and realizes a reduction in gloss unevenness of an image that cannot have been achieved by such conventional ink set having at least three kinds of black inks different from one another in carbon black content as described above.

Although the reason why such effect as described above can be obtained in the ink set according to the present invention is not clear, the inventors of the present invention consider the reason to be as described below. That is, they consider that an effect called a reduction in gloss unevenness of an image cannot be significantly realized until black inks are combined to satisfy the following constitution. For example, at first, an ink set has at least three kinds of black inks different from one another in carbon black content. In the ink set, the at least three kinds of black inks are the black ink Bk1 having the largest carbon black content, the light black ink Lk2 having the smallest carbon black content, and the light black ink Lk1 having a carbon black content smaller than that of the black ink Bk1 and larger than that of the light black ink Lk2. The black ink Bk1, the light black ink Lk1, and the light black ink Lk2 each contains a resin. A ratio (Bk1/Lk2) of the carbon black content in the black ink Bk1 to the carbon black content in the light black ink Lk2 having the smallest carbon black content is in the range of 3.5 or more to 9.0 or less. This constitution will be described below.

At first, the light black ink Lk2 and the black ink Bk1 as a combination of inks with the largest difference in rate at which each of the inks permeates through a recording medium between them out of the three kinds of inks are constituted as described below. That is, a ratio (Bk1/Lk2) of the carbon black content in the black ink Bk1 having the largest carbon black content to the carbon black content in the light black ink Lk2 having the smallest carbon black content is set to be in the range of 3.5 or more to 9.0 or less. In this case, even when each of those inks is applied to a recording medium at first or finally, a difference in state where each of the inks permeates through the recording medium between the inks can be alleviated. As a result, a difference in agglomeration state of carbon black on the surface of the recording medium after the application of the inks to the recording medium is alleviated. Therefore, a change in agglomeration state of carbon black with the order in which the inks are applied to the recording medium may hardly occur.

When the above-described carbon black content ratio (Bk1/Lk2) is smaller than 3.5, it may be impossible to improve the gradation of a monochrome image sufficiently. A small carbon black content ratio (Bk1/Lk2) means that a difference in carbon black content between those black inks reduces. In this case, an improvement in gradation of a monochrome image cannot be expected even when multiple inks are used because carbon black contents in the respective black inks are close to each other. On the other hand, when the carbon black content ratio (Bk1/Lk2) is larger than 9.0, a difference in rate at which each of those black inks permeates through a recording medium between the inks increases. As a result, the gloss unevenness of an image occurs. In particular, the above-described phenomenon occurs remarkably when the light black ink Lk2 that can permeate through a recording medium at a high rate is applied to the recording medium prior to the other inks.

Furthermore, the agglomeration state of carbon black on the surface of a recording medium can be properly controlled by causing each of at least three kinds of black inks constituting the ink set according to the present invention to contain a resin. This is because the resins in the respective black inks serve to "bond" carbon black particles. As a result, carbon black is caused to agglomerate in a uniform state, so the irregularities of an image portion may be reduced. Therefore, such effect as described above cannot be obtained when even one kind of black ink out of the at least three kinds of black inks constituting the ink set does not contain a resin. This constitution is obtained when using a polymer as a dispersant of a carbon black. When black ink containing self-dispersible carbon black is used as black ink constituting the ink set according to the present invention, the ink has only to further contain a resin.

In addition, in the present invention, the carbon black content (mass %) in the black ink Bk1 having the largest carbon black content must be in the range of 2.5 mass % or more to 4.5 mass % or less with respect to the total mass of the black ink Bk1. According to the investigation of the present inventors, when the ink set has the above-described constitution, an improvement in gradation of a monochrome image and the realization of a high black density that have been conventionally of concern upon formation of an image by means of black ink can be achieved. When the carbon black content in the black ink Bk1 having the largest carbon black content is smaller than 2.5 mass %, a sufficient black density cannot be obtained particularly in an image having many black solid portions, and a monochrome image with the depth of black is not obtained in some cases. On the other hand, when the carbon black content in the black ink Bk1 having the largest carbon black content is larger than 4.5 mass %, the "bonding" effect of the resins described above may not be sufficiently obtained, and gloss unevenness may not be sufficiently reduced. In the present invention, the carbon black content in the black ink Bk1 is particularly preferably in the range of 2.5 mass % or more to 4.0 mass % or less.

Furthermore, in the present invention, a ratio (Lk1/Lk2) of the carbon black content of the light black ink Lk1 having an intermediate carbon black content to the carbon black content of the light black ink Lk2 having the smallest carbon black content is set to be in the range of 2.0 or more to 4.0 or less. According to the investigation of the present inventors, in this case, even when the amounts of at least three kinds of black inks different from one another in carbon black content to be applied to a recording medium or the order in which the inks are applied to the recording medium is changed, the balance of the permeability of the light black ink Lk2 having the smallest carbon black content through the recording medium can be kept by applying the light black ink Lk1 in any order. As a result, it becomes possible to reduce gloss unevenness due to a difference in agglomeration state of carbon black on the surface of the recording medium resulting from a difference in printing pass upon application of the black ink Bk1 having the largest carbon black content, that is, a difference in carbon black content resulting in ink permeability.

When the carbon black content ratio (Lk1/Lk2) is smaller than 2.0, a reduction in gloss unevenness may be insufficient. This is because the alleviating effect of the light black ink Lk1 on a difference in permeation rate of a liquid component between the black ink Bk1 and the light black ink Lk2, which is the largest difference, cannot be sufficiently obtained. On the other hand, when the carbon black content ratio (Lk1/Lk2) is larger than 4.0, sufficient gradation may not be obtained over a range from a thin black image portion to a halftone image portion even in the case where both inks are used in combination.

When the ink set according to the present invention are constituted by four or more kinds of black inks, each of the black ink Bk1 having the largest carbon black content and the light black ink Lk2 having the smallest carbon black content should be one kind of ink. Then, suppose that multiple light black inks Lk1 each having an intermediate carbon black content are present.

A carbon black content in ink with unknown composition can be confirmed as described below. At first, the absorbance of the carbon black content is measured with known various carbon black dispersion solutions, and then a standard for a relationship between a carbon black content and an absorbance is created. The absorbance of the ink containing carbon black to be confirmed is measured, and a carbon black content is calculated on the basis of the standard prepared in advance. Here, a commercially available device can be used for measuring an absorbance. For example, a U-3300 Hitachi recording spectrophotometer (manufactured by Hitachi High-Technologies Corporation) is used.

Figure 5B:
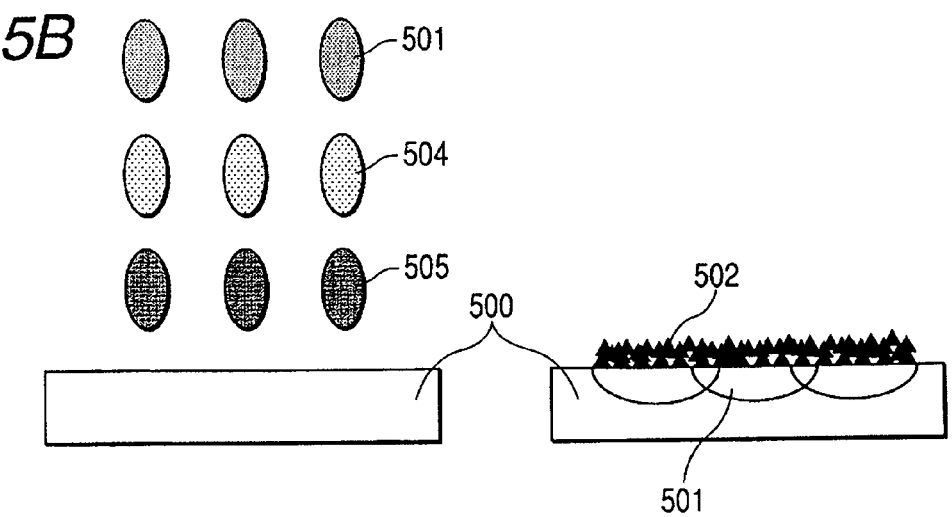

Description will be given of a state commencing on the application of three kinds of black inks different from one another in carbon black content and satisfying the requirements specified in the present invention to a recording medium and ending on the fixation of the inks to the recording medium in case of the formation of an image by means of the inks with reference to FIGS. 5A and 5B. In FIGS. 5A and 5B, reference numerals 501, 505, and 504 denote the light black ink Lk2 having the smallest content of carbon black 502, the black ink Bk1 having the largest content of the carbon black 502, and the light black ink Lk1 having an intermediate content of the carbon black 502, respectively.

FIG. 5A is a schematic view showing an example of the state of the formation of an image. In this example, the droplet 501 of the light black ink Lk2, the droplet 504 of the light black ink Lk1, and the droplet 505 of the black ink Bk1 are applied in the stated order to a recording medium. In addition, FIG. 5B is a schematic view showing an example of the state of the formation of an image. In this example, the droplet 505 of the black ink Bk1, the droplet 504 of the light black ink Lk1, and the droplet 501 of the light black ink Lk2 are applied in the stated order to a recording medium.

In each of the cases of FIGS. 5A and 5B, a uniform agglomeration state is obtained upon fixation of the carbon black 502 to the surface of a recording medium 500 as compared to such case where an image is formed by means of conventional black ink as described above with reference to FIGS. 3A and 3B. A difference in agglomeration state upon fixation of the carbon black 502 to the surface of the recording medium 500 between FIGS. 5A and 5B is also small. This is because, as described above, forming an image by means of three kinds of black inks different from one another in carbon black content and satisfying the requirements specified in the present invention properly controls the states of the carbon black 502 and the liquid component 501 constituting each black ink. Therefore, gloss unevenness inherent in an ink jet recording method can be also reduced.

Figure 5C:
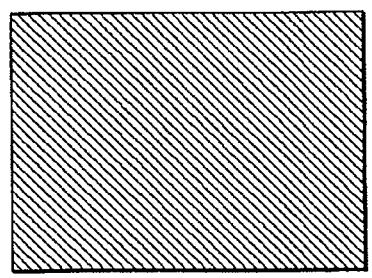

As described above, when an image is formed by means of the ink set according to the present invention, potential examples of the order in which the respective black inks are applied to a recording medium include several orders as well as those of FIGS. 5A and 5B described above. However, when the ink set according to the present invention is used, a difference in gloss of an image can be reduced regardless of the order in which the respective black inks are applied to the recording medium. Therefore, in case of a printing pass, particularly bidirectional printing, as shown in FIG. 5C, gloss unevenness (especially gloss unevenness resulting from the printing pass) is not observed on an image to be obtained.

(Black Ink)

The ink set according to the present invention is characterized in that: at least three kinds of black inks different from one another in carbon black content are used in combination; and carbon black contents in these black inks are constituted as described above. The other constitutions of the respective black inks have only to be identical to that of conventional ink, especially ink jet ink. The respective components constituting the ink to be used in the present invention will be described below.

(Coloring Material)

A coloring material to be used for each black ink constituting the ink set according to the present invention will be described. Each of the black ink Bk1, the light black ink Lk1, and the light black ink Lk2 constituting the ink set according to the present invention contains at least carbon black as a coloring material. The term "carbon black" as used herein includes, of course, resin dispersible carbon black obtained by dispersing carbon black into an aqueous medium by means of a resin or the like as a dispersant, and includes self-dispersible carbon black and microcapsule-type carbon black. When black ink containing the above-mentioned self-dispersible carbon black is used, the ink has only to further contain a resin. Furthermore, carbon black contents in the at least three kinds of black inks constituting the ink set of the present invention must satisfy the above-described constitution of the present invention. That is, the at least three kinds of black inks are the black ink Bk1 having the largest carbon black content, the light black ink Lk2 having the smallest carbon black content, and the light black ink Lk1 having a carbon black content smaller than that of the black ink Bk1 and larger than that of the light black ink Lk2. Then, a ratio (Bk1/Lk2) of the carbon black content in the black ink Bk1 to the carbon black content in the light black ink Lk2 is in the range of 3.5 or more to 9.0 or less. In addition, a ratio (Lk1/Lk2) of the carbon black content in the light black ink Lk1 to the carbon black content in the light black ink Lk2 is in the range of 2.0 or more to 4.0 or less. Furthermore, the carbon black content (mass %) in the black ink Bk1 is in the range of 2.5 mass % or more to 4.5 mass % or less with respect to the total mass of the black ink Bk1. Furthermore, in the present invention, on condition that the above constitution is satisfied, the carbon black content (mass %) in the light black ink Lk1 is particularly preferably in the range of 0.56 mass % or more to less than 4.5 mass %, or the carbon black content (mass %) in the light black ink Lk2 is particularly preferably in the range of 0.28 mass % or more to less than 1.29 mass %.

(Carbon Black)

Carbon black produced by means of a known method such as a contact method, a farnest method, or a thermal method can be used. To be specific, any one of the following products can be used.

Raven: 1170, 1190 ULTRA-II, 1200, 1250, 1255, 1500, 2000, 3500, 5000 ULTRA, 5250, 5750, and 7000 (manufactured by Columbian Chemicals Co.); Black Pearls L, Regal: 330R, 400R, and 660R, Mogul L, Monarch: 700, 800, 880, 900, 1000, 1100, 1300, 1400, and 2000, and Vulcan XC-72R (manufactured by Cabot Corporation); Color Black FW1, FW2, FW2V, FW18, FW200, S150, S160, and S170, Printex: 35, U, V, 140U, 140V; Special Black: 4, 4A, 5, and 6 (manufactured by Degussa Corporation); and No. 25, No. 33, No. 40, No. 47, No. 52, No. 900, No. 2300, MCF-88, MA600, MA7, MA8, and MA100 (manufactured by Mitsubishi Chemical Corporation).

However, the present invention is not limited to them, and any conventionally known carbon black can be used. Carbon black separately and newly prepared for the present invention is also available.

(Organic Pigment)

In particular, each of the light black ink Lk1 and the light black ink Lk2 out of the respective black inks constituting the ink set of the present invention particularly preferably contains an organic pigment in addition to carbon black described above. The presence of the organic pigment can particularly effectively reduce gloss unevenness. When each light black ink contains an organic pigment in addition to carbon black, a difference in agglomeration state of carbon black between each of the light black ink Lk1 and the light black ink Lk2 and the black ink Bk1 having the largest carbon black content is alleviated. As a result, the degrees of irregularities generated on the surface of a recording medium are made substantially identical to each other, so gloss unevenness is particularly effectively reduced. Although the mechanism via which such effect as described above can be obtained has not been sufficiently elucidated, the mechanism is considered to be as described below: when one kind of ink contains dissimilar kinds of pigments, that is, carbon black and an organic pigment together, the agglomeration state of a pigment on the surface of a recording medium tends to improve in uniformity. The above-described effect is obtained particularly significantly when the light black ink Lk2 having the smallest carbon black content contains an organic pigment or when a carbon black content in each of the light black ink Lk1 and the light black ink Lk2 is small and each light black ink contains an organic pigment.

Here, a preferable organic pigment content in each of the light black ink Lk1 and the light black ink Lk2 is not particularly limited as long as an effect of the present invention is obtained and a desired hue is obtained. A ratio (carbon black/organic pigment) of a carbon black content in each of the light black ink Lk1 and the light black ink Lk2 constituting the ink set of the present invention to the content of an organic pigment (a total content when multiple organic pigments are used) in the ink is preferably in the range of 1.0 or more to 20.0 or less. In the present invention, values for: the carbon black contents in the black ink Bk1, the light black ink Lk1, and the light black ink Lk2; and content ratios among them (Bk1/Lk2 and Lk1/Lk2) are calculated while an organic pigment content is not included. This is because a problem to be solved by the present invention called gloss unevenness occurs in dependence mainly on the agglomeration state of carbon black, so it is sufficient to take only a carbon black content into consideration in the present invention.

In addition, in the present invention, in each black ink constituting the ink set, carbon black described above can be appropriately used in combination with an organic pigment having a magenta, yellow, cyan, red, green, orange, blue, violet, or any like other hue for the purpose of, for example, color matching. To be specific, for example, any one of the following products can be used as such organic pigment.

Insoluble azo pigments such as toluidine red, toluidine maroon, Hansa yellow, benzidine yellow, and pyrazolone red; water-soluble azo pigments such as lithol red, helio bordeaux, pigment scarlet, and permanent red 2B; derivatives of vat dyes such as alizarin, indanthrone, and thioindigo maroon; phthalocyanine-based pigments such as phthalocyanine blue and phthalocyanine green; quinacridone-based pigments such as quinacridone red and quinacridone magenta; perylene-based pigments such as perylene red and perylene scarlet; isoindolinone-based pigments such as isoindolinone yellow and isoindolinone orange; imidazolone-based pigments such as benzimidazolone yellow, benzimidazolone orange, and benzimidazolone red; pyranthrone-based pigments such as pyranthrone red and pyranthrone orange; thioindigo-based pigments; condensed azo-based pigments; thioindigo-based pigments; flavanthrone yellow; acylamide yellow; quinophthalone yellow; nickel azo yellow; copper azo methine yellow; perinone orange; anthrone orange; dianthraquinonyl red; dioxazine violet; and any other pigment may be used.

Further, examples of the organic pigment represented by a color index (C.I.) number that can be used include the following.

C.I. Pigment Yellow: 12, 13, 14, 17, 20, 24, 74, 83, 86, 93, 109, 110, 117, 120, 125, 128, 137, 138, 147, 148, 151, 153, 154, 166, and 168, C.I. Pigment Orange: 16, 36, 43, 51, 55, 59, 61, and 71

C.I. Pigment Red: 9, 48, 49, 52, 53, 57, 97, 122, 123, 149, 168, 175, 176, 177, 180, 192, 215, 216, 217, 220, 223, 224, 226, 227, 228, 238, and 240

C.I. Pigment Violet: 19, 23, 29, 30, 37, 40, and 50

C.I. Pigment Blue: 15, 15:1, 15:3, 15:4, 15:6, 22, 60, and 64

C.I. Pigment Green: 7 and 36

C.I. Pigment Brown: 23, 25, and 26

(Carbon Black Dispersion Solution)

Any carbon black listed above is preferably added in the form of a carbon black dispersion solution, which is prepared by dispersing the carbon black into an aqueous medium by means of a resin or the like as a dispersant, to ink. A carbon black dispersion solution that can be used in the present invention will be described below.

Carbon black to be used in the present invention is preferably resin dispersible carbon black dispersed by a resin or microcapsule-type carbon black. Surfactant dispersible carbon black prepared by dispersing carbon black into an aqueous medium by means of a surfactant as a dispersant or self-dispersible carbon black in which a hydrophilic group or the like is introduced to the surface of a carbon black particle to impart dispersibility may be added with a resin. A ratio of a resin content in each black ink constituting the ink set of the present invention to a carbon black content in the black ink is preferably in the range of 0.5 or more to 1.0 or less. A ratio within the above range not only maintains the dispersion stability of carbon black but also effectively reduces gloss unevenness as a problem of the present invention.

(Resin Dispersible Carbon Black)

At first, resin dispersible carbon black will be described. Any resin to be described later can be used as a dispersant or as a resin to be added to the surfactant dispersible carbon black or the self-dispersible carbon black described above. Any one of a natural polymer and a synthetic polymer can be used for the resin. In the present invention, a synthetic polymer such as a water-soluble polymer is preferably used. A method of producing a synthetic polymer is not particularly limited. For example, a synthetic polymer can be produced by causing a monomer having an ionic group and any other polymerizable monomer to react with each other in a non-reactive solvent by means of a catalyst as required.

To be specific, for example, any one of the following products can be used as such resin.

Examples of such resin include: a block copolymer, a random copolymer, and a graft copolymer each composed of at least two monomers (at least one of which is a hydrophilic monomer) selected from styrene and a derivative thereof, vinyl naphthalene and a derivative thereof, an aliphatic alcohol ester and the like of an $\alpha,\beta$-ethylenically unsaturated carboxylic acid, acrylic acid and a derivative thereof, maleic acid and a derivative thereof, itaconic acid and a derivative thereof, fumaric acid and a derivative thereof, vinyl acetate, vinyl alcohol, vinyl pyrrolidone, acrylamide and a derivative thereof, and the like; and salts of the copolymers. In the present invention, a dispersant selected from the group consisting of: a styrene/acrylic polymer compound obtained by polymerizing a monomer having an ionic group and a styrene monomer as essential ingredients; and an ionic group-containing acrylic polymer compound obtained by polymerizing a monomer having an ionic group and a (meth)acrylate monomer having 5 or more carbon atoms as essential ingredients is particularly preferably used.

In the present invention, a dispersing device (such as a paint shaker, a sand mill, an agitator mill, or a three-roll mill), a high-pressure homogenizer (such as a microfluidizer, a nanomizer, or a multimizer), an ultrasonic dispersing device, or the like can be used for dispersing carbon black. Of course, any approach can be used as long as it is a dispersion method to be generally used.

(Microcapsule-Type Carbon Black)

Hereinafter, a Microcapsule-type Carbon black will be described. Examples of a method of coating a carbon black with an organic polymer or the like to prepare a microcapsule include a chemical production method, a physical production method, a physicochemical method, and a mechanical production method. Specific examples thereof include an interfacial polymerization method, an in-situ polymerization method, a submerged cure coating method, a coacervation (phase separation) method, a submerged drying method, a melting dispersion cooling method, an aerial suspension coating method, a spray drying method, an acid precipitation method, and a phase inversion emulsification method.

Organic polymer and nonionic organic polymers may be used as a material constituting the wall membrane substance of a microcapsule. Specific examples of an organic polymer include the following.

Polyamide; polyurethane; polyester; polyurea; an epoxy resin; polycarbonate; a urea resin; a melamine resin; a phenol resin; polysaccharides; gelatin; gum arabic; dextran; casein; protein; natural rubber; carboxypolymethylene; polyvinyl alcohol; polyvinyl pyrrolidone; polyvinyl acetate; polyvinyl chloride; polyvinylidene chloride; cellulose; ethylcellulose; methylcellulose; nitrocellulose; hydroxyethylcellulose; cellulose acetate; polyethylene; polystyrene; a polymer or copolymer of (meth)acrylic acid; a polymer or copolymer of (meth)acrylate; a (meth)acrylic acid-(meth)acrylate copolymer; a styrene-(meth)acrylic acid copolymer; a styrene-maleic acid copolymer; soda alginate; a fatty acid; paraffin; beeswax; water wax; hardened beef tallow; carnauba wax; and albumin. Of those, an organic polymer or the like having an anionic group such as a carboxylic group or a sulfonic group is preferably used.

Specific examples of nonionic organic polymers include the following.

Polyvinyl alcohol, polyethylene glycol monomethacrylate, polypropylene glycol monomethacrylate, and methoxy-polyethylene glycol monomethacrylate, and (co)polymers of them; and a cation ring-opening polymer of 2-oxazoline. Of those, a completely saponified product of polyvinyl alcohol is preferable because it has low water solubility and is easily soluble in hot water but is hardly soluble in cold water.

When a phase inversion method or an acid precipitation method is used for preparing a microcapsule, an anionic organic polymer is used as an organic polymer constituting the wall membrane substance of the microcapsule.

The phase inversion method involves: turning a composite or complex of an anionic organic polymer or the like having self dispersibility or solubility in water and a self-dispersible coloring material, or a mixture of a self-dispersible coloring material, a curing agent, and an anionic organic polymer or the like, into an organic solvent phase; adding water to the organic solvent phase (or adding the organic solvent phase to water); and turning the mixture into a microcapsule while subjecting the mixture to self dispersion (phase inversion emulsification). The phase inversion method has no problem in adding a water-soluble organic solvent or an additive to be used for ink to the organic solvent phase to produce a microcapsule. In particular, a water-soluble organic solvent to be used for ink is preferably added because a dispersion solution for the ink can be directly produced.

The acid precipitation method includes the steps of: neutralizing in whole or in part the anionic groups of an organic polymer or the like having the anionic groups with a basic compound; kneading the resultant with a self-dispersible coloring material in a water based medium; adjusting the pH mixture of the resultant with an acid compound to be a neutral or acidic one to precipitate an anionic group-containing organic polymer or the like; causing the organic polymer or the like to fix on a pigment to produce a water-containing cake; and neutralizing in whole or in part the anionic groups of the water-containing cake with a basic compound to prepare a microcapsule. The acid precipitation method allows a fine anionic microencapsulated coloring material containing a large amount of coloring material to be produced.

Specific examples of a water-soluble organic solvent to be used for such microencapsulation include the following.

Alkyl alcohols such as methanol, ethanol, propanol, and butanol; aromatic hydrocarbons such as benzol, toluol, and xylol; esters such as methyl acetate, ethyl acetate, and butyl acetate; chlorinated hydrocarbons such as chloroform and ethylene dichloride; ketones such as acetone and methyl isobutyl ketone; ethers such as tetrahydrofuran and dioxane; and cellosolves such as methyl cellosolve and butyl cellosolve.

The microcapsule-type coloring materials prepared according to the above method may be separated from the water-soluble organic solvents through centrifugation, filtration, or the like and mixed with water and a required solvent and stirred for re-dispersion to prepare a target microcapsule-type coloring material.

(Polymer-Bonded Self-Dispersible Carbon Black)

Hereinafter, a polymer-bonded self-dispersible Carbon black will be described. The polymer-bonded self-dispersible carbon black preferably contains a reactant of: a functional group chemically bonded to the surface of the carbon black particle either directly or via any other atomic group; and a copolymer of an ionic monomer and a hydrophobic monomer. This is because a copolymerization ratio between the ionic monomer and the hydrophobic monomer as materials for forming a copolymer to be used for denaturing the surface of the carbon black can be appropriately changed, and the change allows the hydrophilicity of the denatured carbon black to be appropriately adjusted. Various properties can also be imparted to the surface of the carbon black particle because the kinds of ionic and hydrophobic monomers to be used and the combination of the monomers can be appropriately changed.

The dispersed particle size of carbon black in a carbon black dispersion solution prepared by means of such method as described above is in the range of preferably 10 nm to 500 nm (both inclusive), or particularly preferably 30 nm to 300 nm (both inclusive). A dispersed particle size within the above range provides, for example, stable dispersion stability.

(Aqueous Medium)

In each black ink constituting the ink set of the present invention, a dispersion medium for carbon black is preferably an aqueous medium, and the aqueous medium is more preferably a mixed solvent of water and a water-soluble organic solvent.

Specific examples of the water-soluble organic solvent include the following.

Alkyl alcohols each having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols in each of which have an alkylene group has 2 to 6 carbon atoms such as ethylene glycol, propylene glycol, butylene glycol, triethylene glycol, 1,2,6-hexane triol, thio diglycol, hexylene glycol, and diethylene glycol; lower alkyl ether acetates such as polyethylene glycol monomethyl ether acetate; glycerin; lower alkyl ethers of polyhydric alcohols such as ethylene glycol monomethyl (or ethyl) ether, diethylene glycol methyl (or ethyl) ether, and triethylene glycol monomethyl (or ethyl) ether; N-methyl-2-pyrrolidone; 2-pyrrolidone; and 1,3-dimethyl-2-imidazolidinone.

In addition, deionized water is desirably used as water.

The content (mass %) of the water-soluble organic solvent in each black ink constituting the ink set of the present invention is preferably in the range of 3.0 mass % or more to 50.0 mass % or less with respect to the total mass of the black ink. In addition, a water content (mass %) in each black ink constituting the ink set of the present invention is preferably in the range of 50.0 mass % or more to 95.0 mass % or less with respect to the total mass of the black ink. Of course, the present invention is not limited to those ranges.

(Other Components)

For maintaining moisture retention, the black ink constituting the ink set of the present invention may use a moisture-retaining solid content such as urea, a urea derivative, trimethylolpropane, or trimethylolethane as well as the above components. The content (mass %) of the moisture-retaining solid content such as urea, a urea derivative, or trimethylolpropane in the black ink is generally in the range of 0.1 mass % or more to 20.0 mass % or less, or more preferably 3.0 mass % or more to 10.0 mass % or less with respect to the total mass of the black ink.

The black ink constituting the ink set of the present invention may contain any one of various additives such as a surfactant, a pH adjustor, a rust inhibitor, an antiseptic, a mildewproofing agent, an antioxidant, an antireducing agent, an evaporation accelerator, and a chelating agent as required as well as the above components.

The surfactant is preferably used with a nonionic surfactant for adjusting a surface tension and for improving ejection property.

(Ink Property)

Each black ink constituting the ink set of the present invention having such components as described above preferably has property with which the ink can be favorably ejected from a recording head particularly in the case where the ink is used for an ink jet recording method. Therefore, the black ink preferably has properties including: a viscosity of 1 to 15 mPa·s, more preferably 1 to 5 mPa·s; and a surface tension of 25 mN/m or more, more preferably 25 to 50 mN/m.

A viscosity of the black ink within the above range is preferable because the ink can be normally ejected even in ink jet recording, permeates through a recording medium quickly owing to its viscosity resistance, and presents no problem in terms of fixability. In addition, a surface tension of the black ink within the above range is preferable because of the following reason. After ink droplets have been ejected in ink jet recording, a force for pulling back a meniscus is strong, or a force for pulling back a meniscus upon projection of the meniscus is relatively strong. Therefore, a problem such as the holding of bubbles or the wetting of an opening portion to be responsible for slippage does not occur.

(Ink Set)

The ink set according to the present invention is obtained by combining at least three kinds of black inks different from one another in carbon black content in ink. Furthermore, in the present invention, in addition to the above at least three kinds of black inks, other inks having various hues such as cyan, magenta, yellow, red, green, blue, orange, and violet hues may be combined. The ink set may be used in such a manner that each ink is stored in each independent ink cartridge. Alternatively, multiple ink cartridges each storing each ink may be combined and integrated with each other to constitute an ink tank. In the present invention, the above constitution, an ink set constituted by an ink cartridge with a head, or an ink set constituted in such a manner that an individual ink cartridge is detachable with respect to an ink jet recording apparatus is substantially referred to as the "ink set". In any case, in the present invention, the ink set has only to be constituted (in an ink jet recording apparatus or as an ink cartridge) in such a manner that at least three kinds of black inks different from one another in carbon black content in ink can be used in combination. In addition to the above form, any modified form is also permitted.

(Ink Jet Recording Method and Ink Jet Recording Apparatus)

The ink set according to the present invention is used for a recording head of an ink jet mode, and is effective as an ink cartridge storing each ink or as a set of inks for filling. In particular, the use of the ink set according to the present invention exerts an excellent effect in a recording head, recording unit, or ink jet recording apparatus of a bubble jet (registered trademark) mode out of the ink jet recording modes.

The representative constitution and principle of an ink jet mode are preferably performed by means of the basic principles disclosed in, for example, U.S. Pat. Nos. 4,723,129 and 4,740,796. The mode is applicable to any one of so-called an on-demand type and a continuous type. In particular, the mode is effective for the on-demand type because of the following reason. At least one driving signal which corresponds to recording information and causes a sudden increase in temperature exceeding nuclear boiling is applied to an electrothermal transducer arranged in correspondence with a sheet or liquid path holding ink, to thereby cause the electrothermal transducer to generate thermal energy. Then, a thermal action surface of a recording head is caused to generate film boiling. As a result, an air bubble in the ink can be formed so as to be in one-to-one correspondence with the driving signal. The growth and contraction of the air bubble cause the ink to be ejected through an opening for ejection, thereby forming at least one droplet. The driving signal is more preferably of a pulse shape because the growth and contraction of an air bubble can be performed immediately and appropriately, and hence ink can be ejected with excellent responsiveness. Such signals as described in U.S. Pat. Nos. 4,463,359 and 4,345,262 are suitable as pulse-shaped driving signals. It should be noted that additionally excellent recording can be performed by adopting the conditions described in U.S. Pat. No. 4,313,124, which is an invention relating to a rate of temperature increase of the thermal action surface.

With regard to the constitution of a recording head, the present invention is effective for any one of the constitutions disclosed in U.S. Pat. Nos. 4,558,333 and 4,459,600 in each of which a thermal action portion is arranged in a bending region as well as such constitution obtained by combining an ejection opening, a liquid path, and an electrothermal transducer (a linear liquid flow path or a right angle liquid flow path) as disclosed in each of the above specifications. The present invention is also effective for the constitution in which an ejection opening common to multiple electrothermal transducers is used as the ejection portion of the electrothermal transducers (Japanese Patent Application Laid-Open No. S59-123670 or the like). Furthermore, a full-line type recording head having a length in correspondence with the width of the largest recording medium that a recording apparatus can perform recording on may have a constitution satisfying the length or a constitution as a single recording head obtained by integrally forming recording heads depending on the combination of such multiple recording heads as disclosed in the above specifications. The present invention can exert the above-described effect with improved effectiveness.

The present invention is also effective for a freely exchangeable chip-type recording head that is mounted on an apparatus main body to enable electrical connection with the apparatus main body and the supply of ink from the apparatus main body, or for a cartridge-type recording head that is integrally mounted on a recording head itself. Adding recovery means, preliminary auxiliary means, or the like to a recording head to be arranged as a constitution of a recording apparatus to which the present invention is applicable is preferable because the effect of the present invention can be additionally stabilized. Specific examples of such means include: capping means, cleaning means, and pressuring or sucking means to a recording head; an electrothermal transducer or a heating element separate from the transducer, or preliminary heating means obtained by combining the transducer and the element; and a preliminary ejection mode for performing ejection separate from recording.

(Recording Medium)

An image forming method using the ink set according to the present invention preferably involves the use of, but not limited to, a recording medium having a coating layer as an ink-receiving layer on at least one surface of any one of various base materials such as paper and a resin film, or the like. In particular, the use of glossy paper or semi-glossy paper which is a recording medium having a coating layer on its surface and is constituted so as to express gloss exerts a significant effect. An example of such recording medium includes a recording medium having a coating layer for receiving ink on at least one surface containing at least a hydrophilic polymer and/or an inorganic porous body. In the present invention, it is preferable to use a recording medium having a 20° gloss in conformance with JIS-K-5400 of 3 or more (more preferably 15 or more) because the effect of the present invention is particularly significantly exerted.

The recording media each having a coating layer for receiving ink can be classified into miscellaneous media depending on, for example, a surface state, the thickness of a coating layer, the size of a pore for absorbing ink, a difference in material for constituting an ink absorbing layer, and the kind of a base material. Examples of such recording media include: glossy paper and a glossy film each having high surface gloss; and microglossy paper and semi-glossy paper each having surface gloss adjusted through processing or the like. In the present invention, it is preferable to use, for example, glossy paper securing sufficient gloss or semi-glossy paper the surface of which is subjected to a treatment such as silk finish out of the above-described recording media because the effect of the present invention is particularly significantly exerted.

A hydrophilic polymer or an inorganic porous body can be used for the ink-receiving layer of each of the above-described recording media. Specific examples of an available hydrophilic polymer include starch, carboxymethylcellulose, methylcellulose, hydroxyethylcellulose, hydroxypropylcellulose, alginic acid, gelatin, polyvinyl alcohol, polyvinyl acetal, polyethylene oxide, sodium polyacrylate, crosslinkable polyacrylic acid, polyvinyl methyl ether, polystyrene sulfonate, quaternary polyvinylpyridine, polyacrylamide, polyvinyl pyrrolidone, polyamine, an aqueous urethane resin, a water-soluble acrylic resin, a water-soluble epoxy compound, and water-soluble polyester. Denatured products of the above polymers such as ion-denatured products including cation-denatured polyvinyl alcohol and cation-denatured polyvinyl pyrrolidone are also available. Specific examples of an available inorganic porous body include silica gel, alumina, zeolite, and porous glass.

In the present invention, out of glossy paper and semi-glossy paper, a so-called gap-type recording medium produced by combining the above-described materials to have pores is preferably used because ink can permeate through the recording medium at a sufficient rate and the recording medium has sufficient ink absorbability. In addition, the acquisition of the excellent gloss of an image requires sufficient ink absorbability. Therefore, a recording medium having an ink-receiving layer which is fine and thick enough to absorb ink is preferably used. In a recording medium having such property, the diameter of a pore of an ink-receiving layer is preferably 10 to 50 nm, or more preferably 20 nm or less, and the thickness of the ink-receiving layer is preferably in the range of 10 μm to 40 μm (both inclusive). The diameter of a pore of the ink-receiving layer of the above-described recording medium is generally smaller than the size of carbon black to be used in the present invention. Therefore, when ink is applied to the recording medium, a liquid component in the ink permeates through the recording medium, that is, the pores of the ink-receiving layer. Meanwhile, carbon black agglomerates on the surface of the recording medium.

EXAMPLES

Hereinafter, the present invention will be described more specifically by way of examples and comparative examples. The present invention is not limited to the following examples without departing from the gist of the present invention. The terms "part" and "%" in the following description are on a mass basis unless otherwise stated. In addition, the term "balance" means the whole is adjusted with water to be 100 parts.

Examples 1 to 11 and Comparative Examples 1 to 11

(Preparation of Carbon Black Dispersion Solution 1)

| Carbon black | 10 parts |
| Glycerin | 6 parts |
| Resin | 10 parts |
| Water | Balance |

A mixed solution having the above composition was dispersed by means of a sand mill manufactured by KANEDA SCIENTIFIC CO., LTD. at 1,500 rpm for 5 hours to yield a carbon black dispersion solution 1 (having a carbon black content of 10 mass %). The dispersion by means of the sand mill was performed under the conditions including a zirconia bead diameter of 0.6 mm and a filling ratio in a pot of 70%. A Black Pearls 880 (manufactured by Cabot Corporation in the U.S.A.) was used as carbon black, and a product obtained by neutralizing a styrene-acrylic resin having a copolymerization ratio of 70:30, a weight average molecular weight of 8,000, and an acid value of 170 with potassium hydroxide in an amount equivalent to the acid value was used as the resin.

(Preparation of Inks 1 to 39)

The carbon black dispersion solution 1 (having a carbon black content of 10 mass %) thus obtained and the respective components shown in Table 1 below were mixed and sufficiently stirred. After that, the resultant was filtered through a microfilter having a pore size of 1.2 μm (manufactured by FUJI PHOTO FILM CO., LTD.) under pressure to yield each of inks 1 to 39.

TABLE 1

| | Ink | | | | | | | | | |
|---|---|---|---|---|---|---|---|---|---|---|
| | 1 | 2 | 3 | 4 | 5 | 6 | 7 | 8 | 9 | 10 |
| Carbon black dispersion solution 1 | 46.0 | 45.0 | 40.0 | 39.0 | 35.0 | 30.0 | 27.2 | 26.0 | 25.2 | 25.0 |
| Glycerin | 7.0 | 7.0 | 7.0 | 7.0 | 7.0 | 7.0 | 7.0 | 7.0 | 7.0 | 7.0 |
| Triethylene glycol | 5.0 | 5.0 | 5.0 | 5.0 | 5.0 | 5.0 | 5.0 | 5.0 | 5.0 | 5.0 |
| Polyethylene glycol (*1) | 7.0 | 7.0 | 7.0 | 7.0 | 7.0 | 7.0 | 7.0 | 7.0 | 7.0 | 7.0 |
| Acetylenol EH (*2) | 1.0 | 1.0 | 1.0 | 1.0 | 1.0 | 1.0 | 1.0 | 1.0 | 1.0 | 1.0 |
| Water | 34.0 | 35.0 | 40.0 | 41.0 | 45.0 | 50.0 | 52.8 | 54.0 | 54.8 | 55.0 |

| | Ink | | | | | | | | | |
|---|---|---|---|---|---|---|---|---|---|---|
| | 11 | 12 | 13 | 14 | 15 | 16 | 17 | 18 | 19 | 20 |
| Carbon black dispersion solution 1 | 24.5 | 20.0 | 19.6 | 18.0 | 17.6 | 16.0 | 14.0 | 13.6 | 12.9 | 12.0 |
| Glycerin | 7.0 | 7.0 | 7.0 | 7.0 | 7.0 | 7.0 | 7.0 | 7.0 | 7.0 | 7.0 |
| Triethylene glycol | 5.0 | 5.0 | 5.0 | 5.0 | 5.0 | 5.0 | 5.0 | 5.0 | 5.0 | 5.0 |
| Polyethylene glycol (*1) | 7.0 | 7.0 | 7.0 | 7.0 | 7.0 | 7.0 | 7.0 | 7.0 | 7.0 | 7.0 |
| Acetylenol EH (*2) | 1.0 | 1.0 | 1.0 | 1.0 | 1.0 | 1.0 | 1.0 | 1.0 | 1.0 | 1.0 |
| Water | 55.5 | 60.0 | 60.4 | 62.0 | 62.4 | 64.0 | 66.0 | 66.4 | 67.1 | 68.0 |

| | Ink | | | | | | | | | |
|---|---|---|---|---|---|---|---|---|---|---|
| | 21 | 22 | 23 | 24 | 25 | 26 | 27 | 28 | 29 | 30 |
| Carbon black dispersion solution 1 | 10.0 | 9.8 | 9.0 | 8.0 | 7.6 | 6.6 | 6.0 | 5.4 | 5.3 | 5.0 |
| Glycerin | 7.0 | 7.0 | 7.0 | 7.0 | 7.0 | 7.0 | 7.0 | 7.0 | 7.0 | 7.0 |
| Triethylene glycol | 5.0 | 5.0 | 5.0 | 5.0 | 5.0 | 5.0 | 5.0 | 5.0 | 5.0 | 5.0 |
| Polyethylene glycol (*1) | 7.0 | 7.0 | 7.0 | 7.0 | 7.0 | 7.0 | 7.0 | 7.0 | 7.0 | 7.0 |
| Acetylenol EH (*2) | 1.0 | 1.0 | 1.0 | 1.0 | 1.0 | 1.0 | 1.0 | 1.0 | 1.0 | 1.0 |
| Water | 70.0 | 70.2 | 71.0 | 72.0 | 72.4 | 73.4 | 74.0 | 74.6 | 74.7 | 75.0 |

TABLE 1-continued

| | Ink | | | | | | | | |
|---|---|---|---|---|---|---|---|---|---|
| | 31 | 32 | 33 | 34 | 35 | 36 | 37 | 38 | 39 |
| Carbon black dispersion solution 1 | 4.9 | 4.7 | 4.5 | 4.3 | 4.0 | 3.8 | 3.3 | 2.7 | 2.2 |
| Glycerin | 7.0 | 7.0 | 7.0 | 7.0 | 7.0 | 7.0 | 7.0 | 7.0 | 7.0 |
| Triethylene glycol | 5.0 | 5.0 | 5.0 | 5.0 | 5.0 | 5.0 | 5.0 | 5.0 | 5.0 |
| Polyethylene glycol (*1) | 7.0 | 7.0 | 7.0 | 7.0 | 7.0 | 7.0 | 7.0 | 7.0 | 7.0 |
| Acetylenol EH (*2) | 1.0 | 1.0 | 1.0 | 1.0 | 1.0 | 1.0 | 1.0 | 1.0 | 1.0 |
| Water | 75.1 | 75.3 | 75.5 | 75.7 | 76.0 | 76.2 | 76.7 | 77.3 | 77.8 |

(*1) An Average molecular weight of 1,000.
(*2) Acetylene glycol ethylene oxide adduct (surfactant; manufactured by Kawaken Fine Chemicals Co., Ltd.)

(Preparation of Ink Sets of Examples 1 to 11 and Ink Sets of Comparative Examples 1 to 11)

The inks 1 to 39 thus obtained were used in combination as shown in Table 2 below to prepare ink sets of Examples 1 to 11 and ink sets of Comparative Examples 1 to 11. As described in Table 4, each ink set is composed of a combination of three kinds of inks, that is, a black ink Bk1 having the largest carbon black content, a light black ink Lk1 having a carbon black content smaller than that of the black ink Bk1, and a light black ink Lk2 having the smallest carbon black content. Table 4 summarizes the carbon black content (mass %) of each of the above three kinds of inks constituting each ink set, a ratio (Bk1/Lk2) of the carbon black content in the black ink Bk1 to the carbon black content in the light black ink Lk2, and a ratio (Lk1/Lk2) of the carbon black content in the light black ink Lk1 to the carbon black content in the light black ink Lk2.

side of the ink jet recording apparatus. A super photopaper SP-101 (manufactured by Canon Inc.) as a recording medium having gloss was used as the recording medium.

(1) Reduction in Gloss Unevenness

An ink jet recording apparatus was filled with each ink set thus obtained to form a gray scale image having a gradation pattern ranging from white to black on a recording medium. Upon formation of the image, the following setting was performed. That is, in each printing duty, the ink application amount was divided into three equal sections, in such a manner that a gray level would be divided into 17 equal sections (a printing duty would change from 40% to 200% in an increment of 10%) before each ink was applied. The state of gloss unevenness of the resultant image was visually observed and visually evaluated. The evaluation criteria for a reduction in gloss unevenness are as described below. Table 3 shows the results.

TABLE 2

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Ink No. | Bk1 Ink | 2 | 2 | 2 | 2 | 2 | 3 | 3 | 3 | 5 | 6 | 10 |
| | Lk1 Ink | 21 | 12 | 14 | 8 | 4 | 23 | 15 | 16 | 17 | 20 | 26 |
| | Lk2 Ink | 30 | 30 | 27 | 19 | 19 | 33 | 33 | 29 | 32 | 35 | 37 |
| Carbon black content (mass %) | Bk1 Ink | 4.5 | 4.5 | 4.5 | 4.5 | 4.5 | 4.0 | 4.0 | 4.0 | 3.5 | 3.0 | 2.5 |
| | Lk1 Ink | 1.00 | 2.00 | 1.80 | 2.60 | 3.90 | 0.90 | 1.76 | 1.60 | 1.40 | 1.20 | 0.66 |
| | Lk2 Ink | 0.50 | 0.50 | 0.60 | 1.29 | 1.29 | 0.45 | 0.45 | 0.53 | 0.47 | 0.40 | 0.33 |
| Carbon black content ratio | Bk1/Lk2 | 9.0 | 9.0 | 7.5 | 3.5 | 3.5 | 8.9 | 8.9 | 7.5 | 7.4 | 7.5 | 7.6 |
| | Lk1/Lk2 | 2.0 | 4.0 | 3.0 | 2.0 | 3.0 | 2.0 | 3.9 | 3.0 | 3.0 | 3.0 | 2.0 |

| | | Comparative Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Ink No. | Bk1 Ink | 2 | 2 | 2 | 2 | 2 | 5 | 10 | 12 | 12 | 2 | 1 |
| | Lk1 Ink | 22 | 13 | 7 | 11 | 9 | 25 | 28 | 24 | 34 | 21 | 21 |
| | Lk2 Ink | 31 | 31 | 18 | 18 | 27 | 36 | 38 | 38 | 39 | 29 | 30 |
| Carbon black content (mass %) | Bk1 Ink | 4.5 | 4.5 | 4.5 | 4.5 | 4.5 | 3.5 | 2.5 | 2.0 | 2.0 | 4.5 | 4.6 |
| | Lk1 Ink | 0.98 | 1.96 | 2.72 | 2.45 | 2.52 | 0.76 | 0.54 | 0.80 | 0.43 | 1.00 | 1.00 |
| | Lk2 Ink | 0.49 | 0.49 | 1.36 | 1.36 | 0.60 | 0.38 | 0.27 | 0.27 | 0.22 | 0.53 | 0.50 |
| Carbon black content ratio | Bk1/Lk2 | 9.2 | 9.2 | 3.3 | 3.3 | 7.5 | 9.2 | 9.3 | 7.4 | 9.1 | 8.5 | 9.2 |
| | Lk1/Lk2 | 2.0 | 4.0 | 2.0 | 1.8 | 4.2 | 2.0 | 2.0 | 3.0 | 2.0 | 1.9 | 2.0 |

(Evaluation)

An image was formed by means of each ink set thus obtained, an ink jet recording apparatus, and a recording medium, and the image was evaluated for reduction in gloss unevenness, gradation, and black density. A BJF-900 (manufactured by Canon Inc.) capable of ejecting ink by applying thermal energy to the ink was used as the ink jet recording apparatus, and bidirectional printing in 8 passes was performed. The ink jet recording apparatus was filled with the black ink Bk1, the light black ink Lk1, and the light black ink Lk2 constituting an ink set in the stated order from the left AA: In each gray level, no haze-like gloss unevenness is present, and no gloss unevenness resulting from a printing pass is observed.

A: In each gray level, nearly no haze-like gloss unevenness is present, and nearly no gloss unevenness resulting from a printing pass is observed.

B: In each gray level, nearly no haze-like gloss unevenness is present, but slight gloss unevenness resulting from a printing pass is observed.

C: In several gray levels, haze-like gloss unevenness is observed, and gloss unevenness resulting from a printing pass is observed.

D: In several gray levels, haze-like gloss unevenness is observed, and gloss unevenness resulting from a printing pass is remarkable.

(2) Gradation

The state of gradation of the image thus obtained was visually observed and visually evaluated. The evaluation criteria for gradation are as described below. Table 3 shows the results.

A: In each gray level, sufficiently smooth gradation can be obtained.

B: In nearly all gray levels, sufficiently smooth gradation can be obtained.

C: No smooth gray gradation can be obtained.

(3) Black Density

The optical density of a portion having a printing duty of 150% of the image thus obtained was measured by means of an RD-918 (manufactured by Gretag Macbeth) and evaluated. The evaluation criteria for a black density are as described below. Table 3 shows the results.

A: An optical density is 2.2 or more.
B: An optical density is 2.0 or more and less than 2.2.
C: An optical density is less than 2.0.

TABLE 3

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Reduction in gloss unevenness | B | B | A | B | A | A | A | AA | AA | AA | AA |
| Gradation | A | B | A | B | B | A | B | A | A | A | A |
| Black density | A | A | A | A | A | A | A | A | A | A | B |

| | Comparative Example | | | | | | | | | | |
|---|---|---|---|---|---|---|---|---|---|---|---|
| | 1 | 2 | 3 | 4 | 5 | 6 | 7 | 8 | 9 | 10 | 11 |
| Reduction in gloss unevenness | C | C | B | D | A | C | C | AA | C | C | C |
| Gradation | A | B | C | C | C | A | A | A | A | B | B |
| Black density | A | A | A | A | A | A | B | C | C | A | A |

Example 12

This example corresponds to the case where microcapsule-type carbon black is used as carbon black.

(Preparation of Carbon Black Dispersion Solution 2)

A mixed solution having a composition of 175 parts of n-butyl methacrylate, 10.5 parts of n-butyl acrylate, 37.5 parts of β-hydroxyethyl methacrylate, 26.8 parts of methacrylic acid, and 20 parts of tert-butylperoxy octoate was prepared. 250 parts of methyl ethyl ketone were heated to 75° C. while being stirred in a nitrogen atmosphere, and then the mixed solution thus obtained was dropped to the resultant over 2 hours. Furthermore, a reaction was carried out for 15 hours while the temperature of the solution was maintained at 75° C., so a resin solution was prepared. Water was added to 11.6 parts of the resultant resin solution, 1.6 parts of diethanolamine, and 30 parts of carbon black (Black Pearls 880 manufactured by Cabot Corporation in the U.S.A.) so that a total amount would be 150 parts. 500 g of zirconia beads having an average particle size of 0.5 mm were added to the mixed solution, and the whole was kneaded by means of a paint shaker for 4 hours. After that, the zirconia beads were filtered out, so a dispersion solution containing a resin and carbon black was obtained. The resultant dispersion solution was diluted by 2-fold with pure water. Furthermore, 1N hydrochloric acid was dropped to the resultant under stirring until a carbon black particle was covered with the resin to be a microcapsule. At this time, the liquid had a pH of 3 to 5. Next, the resultant was subjected to suction filtration, and salt was washed with water, so a water-containing cake was obtained. A 10% aqueous solution of diethanolamine was added in such a manner that the liquid would have a pH of 8.5 to 9.5. After the liquid had been stirred for an additional 1 hour, water was added for adjustment such that a carbon black content would be 10 mass %. Thus, a carbon black dispersion solution 2 (having a carbon black content of 10 mass %) in which a carbon black particle became a microcapsule was obtained.

(Preparation of Inks 40 to 42)

The carbon black dispersion solution 2 (having a carbon black content of 10 mass %) thus obtained and the respective components shown in Table 4 below were mixed and sufficiently stirred. After that, the resultant was filtered through a microfilter having a pore size of 1.2 μm (manufactured by FUJI PHOTO FILM CO., LTD.) under pressure to yield each of inks 40 to 42.

TABLE 4

| | Ink | | |
|---|---|---|---|
| | 40 | 41 | 42 |
| Carbon black dispersion solution 2 | 45.0 | 10.0 | 5.0 |
| Glycerin | 7.0 | 7.0 | 7.0 |
| Triethylene glycol | 5.0 | 5.0 | 5.0 |
| Polyethylene glycol (*1) | 7.0 | 7.0 | 7.0 |
| Acetylenol EH (*2) | 1.0 | 1.0 | 1.0 |
| Water | 35.0 | 70.0 | 75.0 |

(*1) An Average molecular weight of 1,000.
(*2) Acetylene glycol ethylene oxide adduct (surfactant; manufactured by Kawaken Fine Chemicals Co., Ltd.)

(Preparation and Evaluation of Ink Set)

The inks 40 to 42 thus obtained were used in combination to prepare an ink set of Example 12. As described in Table 7, the ink set is composed of a combination of three kinds of inks, that is, a black ink Bk1 having the largest carbon black content, a light black ink Lk1 having a carbon black content smaller than that of the black ink Bk1, and a light black ink Lk2 having the smallest carbon black content. Table 5 summarizes the carbon black content (mass %) of each of the above three kinds of inks constituting the ink set, a ratio (Bk1/Lk2) of the carbon black content in the black ink Bk1 to the carbon black content in the light black ink Lk2, and a ratio (Lk1/Lk2) of the carbon black content in the light black ink Lk1 to the carbon black content in the light black ink Lk2.

The ink set thus obtained was used for evaluation for reduction in gloss unevenness, gradation, and black density in the same manner as that described above. Table 5 shows the results of the evaluation.

TABLE 5

|  |  | Example 12 |
| --- | --- | --- |
| Ink No. | Bk1 Ink | 40 |
|  | Lk1 Ink | 41 |
|  | Lk2 Ink | 42 |
| Carbon black content (mass %) | Bk1 Ink | 4.5 |
|  | Lk1 Ink | 1.0 |
|  | Lk2 Ink | 0.5 |
| Carbon black content ratio | Bk1/Lk2 | 9.0 |
|  | Lk1/Lk2 | 2.0 |
| Reduction in gloss unevenness |  | B |
| Gradation |  | A |
| Black density |  | A |

Example 13

This example corresponds to the case where an ink set has four kinds of inks in which the carbon black content is different from one another.

(Preparation and Evaluation of Ink Set)

The inks 5, 17, 24, and 35 thus obtained above were used in combination as shown in Table 6 below to prepare an ink set of Example 13. As described in Table 6, the ink set is composed of a combination of four kinds of inks, that is, a black ink Bk1 having the largest carbon black content, a light black ink Lk2 having the smallest carbon black content, and two kinds of light black inks Lk1 each having a carbon black content smaller than that of the black ink Bk1 and larger than that of the light black ink Lk2. Table 6 summarizes the carbon black content (mass %) of each of the above four kinds of inks constituting the ink set, a ratio (Bk1/Lk2) of the carbon black content in the black ink Bk1 to the carbon black content in the light black ink Lk2, and a ratio (Lk1/Lk2) of the carbon black content in each light black ink Lk1 to the carbon black content in the light black ink Lk2.

The ink set thus obtained was used for evaluation for reduction in gloss unevenness, gradation, and black density in the same manner as that described above. Setting was performed in such a manner that, in each printing duty, the ink application amount was divided into four equal sections. Table 6 shows the results of the evaluation.

TABLE 6

|  |  | Example 13 |
| --- | --- | --- |
| Ink No. | Bk1 Ink | 5 |
|  | Lk1 Ink | 17 |
|  |  | 24 |
|  | Lk2 Ink | 35 |
| Carbon black content (mass %) | Bk1 Ink | 3.5 |
|  | Lk1 Ink | 1.4 |
|  |  | 0.8 |
|  | Lk2 Ink | 0.4 |
| Carbon black content ratio | Bk1/Lk2 | 8.8 |
|  | Lk1/Lk2 | 3.5, 2.0 |
| Reduction in gloss unevenness |  | B |
| Gradation |  | A |
| Black density |  | A |

Example 14, and Comparative Examples 12 and 13

Each of these examples corresponds to the case where self-dispersible carbon black is used as carbon black.

(Preparation of Carbon Black Dispersion Solution 3)

| Carbon black | 10 parts |
| --- | --- |
| Glycerin | 6 parts |
| Water | Balance |

A mixed solution having the above composition was dispersed by means of a sand mill manufactured by KANEDA SCIENTIFIC CO., LTD. at 1,500 rpm for 5 hours to yield a carbon black dispersion solution 3 (having a carbon black content of 10 mass %). The dispersion by means of the sand mill was performed under the conditions including a zirconia bead diameter of 0.6 mm and a filling ratio in a pot of 70%. A CaboJet 200 (manufactured by Cabot Corporation) was used as carbon black. This carbon black is a self-dispersible carbon black in which hydrophilic group is bonded to the surface of the carbon black pigment.

(Preparation of Inks 43 to 48)

The carbon black dispersion solution 3 (having a carbon black content of 10 mass %) thus obtained and the respective components shown in Table 7 below were mixed and sufficiently stirred. After that, the resultant was filtered through a microfilter having a pore size of 1.2 μm (manufactured by FUJI PHOTO FILM CO., LTD.) under pressure to yield each of inks 43 to 48. In Table 9 below, the same resin as that used for the preparation of the carbon black dispersion solution 1 was used as the resin. That is, a product obtained by neutralizing a styrene-acrylic resin having a copolymerization ratio of 70:30, a weight average molecular weight of 8,000, and an acid value of 170 with potassium hydroxide in an amount equivalent to the acid value was used.

TABLE 7

|  | Ink | | | | | |
| --- | --- | --- | --- | --- | --- | --- |
|  | 43 | 44 | 45 | 46 | 47 | 48 |
| Carbon black dispersion solution 3 | 45.0 | 10.0 | 5.0 | 45.0 | 10.0 | 5.0 |
| Glycerin | 7.0 | 7.0 | 7.0 | 7.0 | 7.0 | 7.0 |
| Triethylene glycol | 5.0 | 5.0 | 5.0 | 5.0 | 5.0 | 5.0 |
| Polyethylene glycol (*1) | 7.0 | 7.0 | 7.0 | 7.0 | 7.0 | 7.0 |
| Acetylenol EH (*2) | 1.0 | 1.0 | 1.0 | 1.0 | 1.0 | 1.0 |
| Resin (*3) | 4.5 | 1.0 | 0.5 |  |  |  |
| Water | 30.5 | 69.0 | 74.5 | 35.0 | 70.0 | 75.0 |

(*1) An Average molecular weight of 1,000.
(*2) Acetylene glycol ethylene oxide adduct (surfactant; manufactured by Kawaken Fine Chemicals Co., Ltd.)
(*3) The same one as that used for the preparation of the carbon black dispersion solution 1.

(Preparation and Evaluation of Ink Set of Example 14 and an Ink Set of Comparative Examples 12 and 13

The inks 43 to 48 and inks 21 and 30 thus obtained were used in combination as shown in Table 8 below to prepare an ink set of Example 14 and an ink set of Comparative Examples 12 and 13. As described in Table 7, each ink set is composed of a combination of three kinds of inks, that is, a black ink Bk1 having the largest carbon black content, a light black ink Lk1 having a carbon black content smaller than that of the black ink Bk1, and a light black ink Lk2 having the smallest carbon black content. Table 8 summarizes the carbon black content (mass %) of each of the above three kinds of inks constituting each ink set, a ratio (Bk1/Lk2) of the carbon black content in the black ink Bk1 to the carbon black content in the light black ink Lk2, and a ratio (Lk1/Lk2) of the carbon black content in the light black ink Lk1 to the carbon black content in the light black ink Lk2.

The respective ink sets thus obtained were used for evaluation for reduction in gloss unevenness, gradation, and black density in the same manner as that described above. Table 8 shows the results of the evaluation.

TABLE 8

|  |  | Example | Comparative Example | |
|---|---|---|---|---|
|  |  | 14 | 12 | 13 |
| Ink No. | Bk1 Ink | 43 | 46 | 46 |
|  | Lk1 Ink | 44 | 47 | 21 |
|  | Lk2 Ink | 45 | 48 | 30 |
| Carbon black content (mass %) | Bk1 Ink | 4.5 | 4.5 | 4.5 |
|  | Lk1 Ink | 1.0 | 1.0 | 1.0 |
|  | Lk2 Ink | 0.5 | 0.5 | 0.5 |
| Carbon black content ratio | Bk1/Lk2 | 9.0 | 9.0 | 9.0 |
|  | Lk1/Lk2 | 2.0 | 2.0 | 2.0 |
| Reduction in gloss unevenness |  | B | C | C |
| Gradation |  | A | A | A |
| Black density |  | A | A | A |

Examples 15 and 16

Each of these examples corresponds to the case where an organic pigment is used as a coloring material for the light black ink Lk1 and/or the light black ink Lk2 in addition to carbon black.

(Preparation of Cyan Pigment Dispersion Solution)

| C.I. Pigment Blue 15:3 | 10 parts |
|---|---|
| Glycerin | 6 parts |
| Resin | 10 parts |
| Water | Balance |

(Preparation of Magenta Pigment Dispersion Solution)

| C.I. Pigment Red 122 | 10 parts |
|---|---|
| Glycerin | 6 parts |
| Resin | 10 parts |
| Water | Balance |

The respective mixed solutions having the above compositions were dispersed by means of a sand mill manufactured by KANEDA SCIENTIFIC CO., LTD. at 1,500 rpm for 5 hours to yield a cyan pigment dispersion solution (having a pigment content of 10 mass %) and a magenta pigment dispersion solution (having a pigment content of 10 mass %). The dispersion by means of the sand mill was performed under the conditions including a zirconia bead diameter of 0.6 mm and a filling ratio in a pot of 70%.

(Preparation of Inks 49 to 51)

The cyan pigment dispersion solution (having a pigment content of 10 mass %) and the magenta pigment dispersion solution (having a pigment content of 10 mass %) thus obtained, the carbon black dispersion solution 1 (having a carbon black content of 10 mass %), and the respective components shown in Table 9 below were mixed and sufficiently stirred. After that, the resultant was filtered through a microfilter having a pore size of 1.2 μm (manufactured by FUJI PHOTO FILM CO., LTD.) under pressure to yield each of inks 49 to 51. A Black Pearls 880 (manufactured by Cabot Corporation in the U.S.A.) was used as carbon black, and a product obtained by neutralizing a styrene-acrylic resin having a copolymerization ratio of 70:30, a weight average molecular weight Mw of 8,000, and an acid value of 170 with potassium hydroxide in an amount equivalent to the acid value was used as the resin.

TABLE 9

|  | Ink | | |
|---|---|---|---|
|  | 49 | 50 | 51 |
| Carbon black dispersion solution 1 | 5.0 | 18.0 | 6.0 |
| Cyan pigment dispersion solution | 0.5 | 1.8 | 0.6 |
| Magenta pigment dispersion solution | 1.0 | 5.0 | 1.7 |
| Glycerin | 7.0 | 7.0 | 7.0 |
| Triethylene glycol | 5.0 | 5.0 | 5.0 |
| Polyethylene glycol (*1) | 7.0 | 7.0 | 7.0 |
| Acetylenol ER (*2) | 1.0 | 1.0 | 1.0 |
| Water | 73.5 | 55.2 | 71.7 |

(*1) An Average molecular weight of 1,000.
(*2) Acetylene glycol ethylene oxide adduct (surfactant; manufactured by Kawaken Fine Chemicals Co., Ltd.)

(Preparation and Evaluation of Ink Set)

The inks 49 to 51 and inks 2 and 21 thus obtained were used in combination as shown in Table 10 below to prepare ink sets of Examples 15 and 16. As described in Table 10, each ink set is composed of a combination of three kinds of inks, that is, a black ink Bk1 having the largest carbon black content, a light black ink Lk1 having a carbon black content smaller than that of the black ink Bk1, and a light black ink Lk2 having the smallest carbon black content. Table 12 summarizes the carbon black content (mass %) of each of the above three kinds of inks constituting each ink set, a ratio (Bk1/Lk2) of the carbon black content in the black ink Bk1 to the carbon black content in the light black ink Lk2, and a ratio (Lk1/Lk2) of the carbon black content in the light black ink Lk1 to the carbon black content in the light black ink Lk2. The carbon black content was calculated as value without the organic pigment content.

The respective ink sets thus obtained were used for evaluation for reduction in gloss unevenness, gradation, and black density in the same manner as that described above. Table 10 shows the results of the evaluation.

TABLE 10

|  |  | Example | |
|---|---|---|---|
|  |  | 15 | 16 |
| Ink No. | Bk1 Ink | 2 | 2 |
|  | Lk1 Ink | 21 | 50 |
|  | Lk2 Ink | 49 | 51 |
| Carbon black content (mass %) | Bk1 Ink | 4.5 | 4.5 |
|  | Lk1 Ink | 1.0 | 1.8 |
|  | Lk2 Ink | 0.5 | 0.6 |
| Carbon black content ratio | Bk1/Lk2 | 9.0 | 7.5 |
|  | Lk1/Lk2 | 2.0 | 3.0 |
| Reduction in gloss unevenness |  | A | AA |
| Gradation |  | A | A |
| Black density |  | A | A |

This application claims priority from Japanese Patent Application No. 2005-069840 filed on Mar. 11, 2005, which is hereby incorporated by reference herein.

What is claimed is:

1. An ink jet recording apparatus comprising:
   an ink set;
   an ink storage portion storing the ink set; and
   a recording head for ejecting the ink set in both an approaching route of a printing pass and a returning route of the printing pass,
   wherein:
   the ink set comprises at least three kinds of black inks,
   the at least three kinds of black inks are different from one another in carbon black content in ink,
   the at least three kinds of black inks comprise a black ink Bk1 having a largest carbon black content, a light black ink Lk2 having a smallest carbon black content, and a light black ink Lk1 having a carbon black content smaller than that of the black ink Bk1 and larger than that of the light black ink Lk2,
   the black ink Bk1, the light black ink Lk1, and the light black ink Lk2 each comprise a resin,
   a ratio (Bk1/Lk2) of the carbon black content in the black ink Bk1 to the carbon black content in the light black ink Lk2 is in a range of 3.5 or more to 9.0 or less,
   a ratio (Lk1/Lk2) of the carbon black content in the light black ink Lk1 to the carbon black content in the light black ink Lk2 is in a range of 2.0 or more to 4.0 or less,
   the carbon black content (mass %) in the black ink Bk1 is in a range of 2.5 mass % or more to 4.5 mass % or less with respect to a total mass of the black ink Bk1,
   the recording head ejects the at least three kinds of black inks on to a recording medium in a different order in the approaching route of the printing pass from that in the returning route of the printing pass, and
   at least one of the at least three kinds of black inks contains polyethylene glycol having an average molecular weight of 1,000.

2. An image forming method comprising the steps of:
   forming an image on a recording medium using at least three kinds of black inks different from one another in carbon black content in ink in combination, wherein:
   the at least three kinds of black inks comprise a black ink Bk1 having a largest carbon black content, a light black ink Lk2 having a smallest carbon black content, and a light black ink Lk1 having a carbon black content smaller than that of the black ink Bk1 and larger than that of the light black ink Lk2,
   the black ink Bk1, the light black ink Lk1, and the light black ink Lk2 each comprise a resin,
   a ratio (Bk1/Lk2) of the carbon black content in the black ink Bk1 to the carbon black content in the light black ink Lk2 is in a range of 3.5 or more to 9.0 or less,
   a ratio (Lk1/Lk2) of the carbon black content in the light black ink Lk1 to the carbon black content in the light black ink Lk2 is in a range of 2.0 or more to 4.0 or less, and
   the carbon black content (mass %) in the black ink Bk1 is in a range of 2.5 mass % or more to 4.5 mass % or less with respect to a total mass of the black ink Bk1;
   applying the at least three kinds of black inks to a recording medium in an approaching route of a printing pass in an order different from that in a returning route of the printing pass, and
   at least one of the at least three kinds of black inks contains polyethylene glycol having an average molecular weight of 1,000.

3. The image forming method according to claim 2, wherein the carbon black content (mass %) in the black ink Bk1 is in a range of 2.5 mass % or more to 4.0 mass % or less with respect to the total mass of the black ink Bk1.

4. The image forming method according to claim 2, wherein the carbon black content ratio (Bk1/Lk2) is in a range of 3.5 or more to 7.5 or less.

5. The image forming method according to claim 2, wherein the carbon black content ratio (Lk1/Lk2) is in a range of 2.0 or more to 3.0 or less.

6. The image forming method according to claim 2, wherein the light black ink Lk1 further comprises an organic pigment.

7. The image forming method according to claim 2, wherein the light black ink Lk2 further comprises an organic pigment.

8. The image forming method according to claim 2, wherein the carbon black content (mass %) in the light black ink Lk1 is in a range of 0.56 mass % or more to less than 4.5 mass % with respect to a total mass of the light black ink Lk1.

9. The image forming method according to claim 2, wherein the carbon black content (mass %) in the light black ink Lk2 is in a range of 0.28 mass % or more to less than 1.29 mass % with respect to a total mass of the light black ink Lk2.

10. The image forming method according to claim 2, further including the steps of:
    ejecting the at least three kinds of black inks by an ink jet method; and
    performing recording on the recording medium.

11. The image forming method according to claim 2, further including the steps of:
    providing an ink storage portion for storing the at least three kinds of black inks; and
    providing a recording head for ejecting the at least three kinds of black inks onto the recording medium.

12. An image forming method comprising the steps of:
    forming an image on a recording medium using at least three kinds of black inks different from one another in carbon black content in ink in combination, wherein:
    the at least three kinds of black inks comprise a black ink Bk1 having a largest carbon black content, a light black ink Lk2 having a smallest carbon black content, and a light black ink Lk1 having a carbon black content smaller than that of the black ink Bk1 and larger than that of the light black ink Lk2;
    the black ink Bk1, the light black ink Lk1, and the light black ink Lk2 each comprise a resin;
    a ratio (Bk1/Lk2) of the carbon black content in the black ink Bk1 to the carbon black content in the light black ink Lk2 is in a range of 3.5 or more to 9.0 or less;
    a ratio (Lk1/Lk2) of the carbon black content in the light black ink Lk1 to the carbon black content in the light black ink Lk2 is in a range of 2.0 or more to 4.0 or less, and
    the carbon black content (mass %) in the black ink Bk1 is in a range of 2.5 mass % or more to 4.5 mass % or less with respect to a total mass of the black ink Bk1;
    providing a recording head having an ejection opening train for the light black ink Lk1 arranged between ejection opening trains for the black ink Bk1 and the light black ink Lk2;
    applying the at least three kinds of black inks to a recording medium using the recording head in an approaching route of a printing pass in an order different from that in a returning route of the printing pass, and
    at least one of the at least three kinds of black inks contains polyethylene glycol having an average molecular weight of 1,000.

* * * * *